(12) United States Patent
Kippie et al.

(10) Patent No.: US 7,566,686 B2
(45) Date of Patent: Jul. 28, 2009

(54) SHALE INHIBITION ADDITIVE FOR OIL/GAS DOWN HOLE FLUIDS AND METHODS FOR MAKING AND USING SAME

(75) Inventors: David P. Kippie, San Antonio, TX (US); Larry W. Gatlin, San Antonio, TX (US)

(73) Assignee: Clearwater International, LLC, Houston, TX (US)

( * ) Notice: Subject to any disclaimer, the term of this patent is extended or adjusted under 35 U.S.C. 154(b) by 20 days.

(21) Appl. No.: 11/891,317

(22) Filed: Aug. 9, 2007

(65) Prior Publication Data

US 2008/0039345 A1 Feb. 14, 2008

Related U.S. Application Data

(62) Division of application No. 10/999,796, filed on Nov. 29, 2004, now Pat. No. 7,268,100.

(51) Int. Cl.
*C09K 8/04* (2006.01)
*C09K 8/22* (2006.01)
*E21B 43/267* (2006.01)

(52) U.S. Cl. .............. 507/260; 507/110; 507/120; 507/131; 507/138; 507/140; 507/141; 507/145; 507/213; 507/225; 507/241; 507/244; 507/248; 507/265; 507/269; 507/276

(58) Field of Classification Search .................... None
See application file for complete search history.

(56) References Cited

U.S. PATENT DOCUMENTS

| 2,761,835 | A | * | 9/1956 | Brown | 507/240 |
|---|---|---|---|---|---|
| 3,059,909 | A | * | 10/1962 | Wise | 261/39.3 |
| 3,163,219 | A | * | 12/1964 | Wyant et al. | 166/283 |
| 3,301,723 | A | * | 1/1967 | Crisp | 149/20 |
| 3,301,848 | A | * | 1/1967 | Halleck | 536/123.1 |
| 3,303,896 | A | * | 2/1967 | Tillotson et al. | 175/69 |
| 3,307,430 | A | * | 3/1967 | Bauder | 475/146 |
| 3,317,430 | A | * | 5/1967 | Priestly et al. | 510/503 |
| 3,645,896 | A | * | 2/1972 | Larsen | 507/243 |
| 3,888,312 | A | * | 6/1975 | Tiner et al. | 166/308.5 |
| 3,933,205 | A | * | 1/1976 | Kiel | 166/308.1 |
| 3,937,283 | A | * | 2/1976 | Blauer et al. | 166/307 |
| 3,960,736 | A | * | 6/1976 | Free et al. | 507/216 |
| 3,965,982 | A | * | 6/1976 | Medlin | 166/249 |
| 3,990,978 | A | * | 11/1976 | Hill | 507/235 |
| 4,007,792 | A | * | 2/1977 | Meister | 166/308.2 |
| 4,067,389 | A | * | 1/1978 | Savins | 166/246 |
| 4,108,782 | A | * | 8/1978 | Thompson | 507/205 |
| 4,113,631 | A | * | 9/1978 | Thompson | 507/202 |
| 4,378,845 | A | * | 4/1983 | Medlin et al. | 166/297 |
| 4,461,716 | A | * | 7/1984 | Barbarin et al. | 516/15 |
| 4,479,041 | A | * | 10/1984 | Fenwick et al. | 200/81 R |
| 4,506,734 | A | * | 3/1985 | Nolte | 166/308.1 |
| 4,514,309 | A | * | 4/1985 | Wadhwa | 507/211 |
| 4,541,935 | A | * | 9/1985 | Constien et al. | 507/225 |
| 4,549,608 | A | * | 10/1985 | Stowe et al. | 166/280.1 |
| 4,561,985 | A | * | 12/1985 | Glass, Jr. | 507/108 |
| 4,623,021 | A | * | 11/1986 | Stowe | 166/250.1 |
| 4,654,266 | A | * | 3/1987 | Kachnik | 428/403 |
| 4,657,081 | A | * | 4/1987 | Hodge | 166/308.5 |
| 4,660,643 | A | * | 4/1987 | Perkins | 166/283 |
| 4,683,068 | A | * | 7/1987 | Kucera | 507/201 |
| 4,686,052 | A | * | 8/1987 | Baranet et al. | 507/244 |
| 4,695,389 | A | * | 9/1987 | Kubala | 507/244 |
| 4,705,113 | A | * | 11/1987 | Perkins | 166/302 |
| 4,714,115 | A | * | 12/1987 | Uhri | 166/308.1 |
| 4,718,490 | A | * | 1/1988 | Uhri | 166/281 |
| 4,718,790 | A | * | 1/1988 | Layton | 404/101 |
| 4,724,905 | A | * | 2/1988 | Uhri | 166/250.1 |
| 4,725,372 | A | * | 2/1988 | Teot et al. | 507/129 |
| 4,739,834 | A | * | 4/1988 | Peiffer et al. | 166/308.4 |
| 4,741,401 | A | * | 5/1988 | Walles et al. | 166/300 |
| 4,779,680 | A | * | 10/1988 | Sydansk | 166/300 |
| 4,795,574 | A | * | 1/1989 | Syrinek et al. | 507/238 |
| 4,817,717 | A | * | 4/1989 | Jennings et al. | 166/278 |
| 4,830,106 | A | * | 5/1989 | Uhri | 166/250.1 |
| 4,846,277 | A | * | 7/1989 | Khalil et al. | 166/280.1 |
| 4,848,468 | A | * | 7/1989 | Hazlett et al. | 166/300 |
| 4,852,650 | A | * | 8/1989 | Jennings et al. | 166/250.1 |
| 4,869,322 | A | * | 9/1989 | Vogt et al. | 166/280.1 |
| 4,892,147 | A | * | 1/1990 | Jennings et al. | 166/280.2 |
| 4,926,940 | A | * | 5/1990 | Stromswold | 166/247 |

(Continued)

FOREIGN PATENT DOCUMENTS

EP 0730018 A1 9/1996

(Continued)

OTHER PUBLICATIONS

US 5,392,195, 01/1995, (withdrawn).*

(Continued)

*Primary Examiner*—James Seidleck
*Assistant Examiner*—John J Figueroa
(74) *Attorney, Agent, or Firm*—Robert W Strozier

(57) ABSTRACT

An under-balanced drilling fluid additive is disclosed which reduces reactive shale and/or clay swelling during under-balanced drilling operations, where the additive includes an effective amount of a choline salt. A method for under-balanced drilling is also disclosed including the step of circulating a drilling fluid including an effective amount of a choline salt to reduce reactive shale and/or clay swelling during under-balanced drilling operations.

21 Claims, No Drawings

U.S. PATENT DOCUMENTS

| | | | | |
|---|---|---|---|---|
| 4,938,286 A * | 7/1990 | Jennings, Jr. | | 166/280.1 |
| 5,005,645 A * | 4/1991 | Jennings et al. | | 166/280.1 |
| 5,024,276 A * | 6/1991 | Borchardt | | 166/308.6 |
| 5,057,234 A * | 10/1991 | Bland et al. | | 507/128 |
| 5,067,556 A * | 11/1991 | Fudono et al. | | 62/196.4 |
| 5,067,566 A * | 11/1991 | Dawson | | 166/308.5 |
| 5,074,359 A * | 12/1991 | Schmidt | | 166/280.1 |
| 5,082,579 A * | 1/1992 | Dawson | | 507/211 |
| 5,106,518 A * | 4/1992 | Cooney et al. | | 507/211 |
| 5,110,486 A * | 5/1992 | Manalastas et al. | | 507/260 |
| 5,224,546 A * | 7/1993 | Smith et al. | | 166/300 |
| 5,228,510 A * | 7/1993 | Jennings et al. | | 166/263 |
| 5,246,073 A * | 9/1993 | Sandiford et al. | | 166/295 |
| 5,259,455 A * | 11/1993 | Nimerick et al. | | 166/308.5 |
| 5,330,005 A * | 7/1994 | Card et al. | | 166/280.2 |
| 5,342,530 A * | 8/1994 | Aften et al. | | 507/222 |
| 5,363,919 A * | 11/1994 | Jennings, Jr. | | 166/308.1 |
| 5,380,706 A * | 1/1995 | Himes et al. | | 507/129 |
| 5,402,846 A * | 4/1995 | Jennings et al. | | 166/259 |
| 5,411,091 A * | 5/1995 | Jennings, Jr. | | 166/280.1 |
| 5,424,284 A * | 6/1995 | Patel et al. | | 507/129 |
| 5,439,055 A * | 8/1995 | Card et al. | | 166/280.2 |
| 5,465,792 A * | 11/1995 | Dawson et al. | | 166/295 |
| 5,472,049 A * | 12/1995 | Chaffee et al. | | 166/250.1 |
| 5,482,116 A * | 1/1996 | El-Rabaa et al. | | 166/250.1 |
| 5,488,083 A * | 1/1996 | Kinsey et al. | | 507/211 |
| 5,497,831 A * | 3/1996 | Hainey et al. | | 166/308.1 |
| 5,501,275 A * | 3/1996 | Card et al. | | 166/280.2 |
| 5,551,516 A * | 9/1996 | Norman et al. | | 166/308.2 |
| 5,624,886 A * | 4/1997 | Dawson et al. | | 507/217 |
| 5,635,458 A * | 6/1997 | Lee et al. | | 507/240 |
| 5,649,596 A * | 7/1997 | Jones et al. | | 166/300 |
| 5,669,447 A * | 9/1997 | Walker et al. | | 166/300 |
| 5,693,837 A * | 12/1997 | Smith et al. | | 556/148 |
| 5,711,396 A * | 1/1998 | Joerg et al. | | 180/444 |
| 5,722,490 A * | 3/1998 | Ebinger | | 166/281 |
| 5,755,286 A * | 5/1998 | Ebinger | | 166/281 |
| 5,806,597 A * | 9/1998 | Tjon-Joe-Pin et al. | | 166/300 |
| 5,807,812 A * | 9/1998 | Smith et al. | | 507/238 |
| 5,877,127 A * | 3/1999 | Card et al. | | 507/273 |
| 5,908,073 A * | 6/1999 | Nguyen et al. | | 166/276 |
| 5,908,814 A * | 6/1999 | Patel et al. | | 507/131 |
| 5,964,295 A * | 10/1999 | Brown et al. | | 166/308.2 |
| 5,979,557 A * | 11/1999 | Card et al. | | 166/300 |
| 6,016,871 A * | 1/2000 | Burts, Jr. | | 166/300 |
| 6,035,936 A * | 3/2000 | Whalen | | 166/308.3 |
| 6,054,417 A * | 4/2000 | Graham et al. | | 507/238 |
| 6,059,034 A * | 5/2000 | Rickards et al. | | 166/280.2 |
| 6,060,436 A * | 5/2000 | Snyder et al. | | 507/266 |
| 6,069,118 A * | 5/2000 | Hinkel et al. | | 507/277 |
| 6,123,394 A * | 9/2000 | Jeffrey | | 299/16 |
| 6,133,205 A * | 10/2000 | Jones | | 507/276 |
| 6,135,205 A * | 10/2000 | Phillips | | 166/297 |
| 6,147,034 A * | 11/2000 | Jones et al. | | 507/238 |
| 6,162,449 A * | 12/2000 | Maier et al. | | 424/401 |
| 6,162,766 A * | 12/2000 | Muir et al. | | 507/267 |
| 6,169,058 B1 * | 1/2001 | Le et al. | | 507/222 |
| 6,228,812 B1 * | 5/2001 | Dawson et al. | | 507/221 |
| 6,247,543 B1 * | 6/2001 | Patel et al. | | 175/64 |
| 6,283,212 B1 * | 9/2001 | Hinkel et al. | | 166/279 |
| 6,291,405 B1 * | 9/2001 | Lee et al. | | 507/136 |
| 6,330,916 B1 * | 12/2001 | Rickards et al. | | 166/280.2 |
| 6,756,345 B2 * | 6/2004 | Pakulski et al. | | 507/246 |
| 6,793,018 B2 * | 9/2004 | Dawson et al. | | 166/300 |
| 6,875,728 B2 * | 4/2005 | Gupta et al. | | 507/240 |
| 2005/0130847 A1 | 6/2005 | Gatlin et al. | | |
| 2005/0137114 A1 | 6/2005 | Gatlin et al. | | |
| 2005/0153846 A1 | 7/2005 | Gatlin | | |
| 2005/0250666 A1 | 11/2005 | Gatlin et al. | | |
| 2006/0194700 A1 | 8/2006 | Gatlin et al. | | |

FOREIGN PATENT DOCUMENTS

| | | |
|---|---|---|
| EP | 730018 A1 * | 9/1996 |
| WO | WO 98/56497 | 12/1998 |
| WO | WO 9856497 A1 * | 12/1998 |

OTHER PUBLICATIONS

U.S. Appl. No. 11/328,432, filed Jan. 9, 2006, Wilson.
U.S. Appl. No. 11/293,859, filed Dec. 2, 2005, Kippie et al.
U.S. Appl. No. 11/298,547, filed Dec. 9, 2005, Gatlin et al.
U.S. Appl. No. 11/298,556, filed Dec. 9, 2005, Gatlin et al.
U.S. Appl. No. 11/339,303, filed Jan. 25, 2006, Lukos et al.
U.S. Appl. No. 11/545,387, filed Oct. 10, 2006, Gatlin et al.
U.S. Appl. No. 11/554,834, filed Oct. 31, 2006, Venditto et al.

* cited by examiner

US 7,566,686 B2

SHALE INHIBITION ADDITIVE FOR OIL/GAS DOWN HOLE FLUIDS AND METHODS FOR MAKING AND USING SAME

RELATED APPLICATIONS

This application is a divisional application of U.S. patent application Ser. No. 10/999,796 filed Nov. 29, 2004 now U.S. Pat. No. 7,268,100.

BACKGROUND OF THE INVENTION

1. Field of the Invention

The present invention relates to a method for reducing reactive shale and/or clay swelling in under-balanced drilling operations and to methods for making and using same.

More particularly, the present invention relates to a method for reducing reactive shale and/or clay swelling in under-balanced drilling operations using a drilling fluid including an anti-swelling additive having an effective amount of a choline salt (a 2-hydroxyethyl trimethylammonium salt), an under-balanced, drilling fluid including an effective amount of choline salt and to methods for making and using same. The present invention also relates to general purpose drilling fluids for overbalanced drilling, fracturing fluids, and completion fluids including an anti-swelling additive having an effective amount of a choline carboxylate salts and to methods for using same.

2. Description of the Related Art

Shale and/or clay swelling is a common problem during the drilling phase. This problem leads to potential stuck-pipe or lost circulation both of which can increase drilling costs and/or impede production rates. This is especially true when the composition or continuous phase of the drilling fluid is comprised of water. Water in the form of mist, steam or foam is one of the main components of an under-balanced drilling fluid; as a result, shale and/or clay-stabilizing technology is a critical when using an under-balanced drilling fluid.

Historically, shale and/or clay-stabilizing technology has consisted primarily of potassium chloride, potassium formate and anionic polymers/co-polymers.

U.S. Pat. No. 5,635,458 teaches the use of a conventional drilling fluid that reduces water adsorption and hydration of argillaceous rocks. This conventional drilling fluid includes a glycol having a molecular weight of less than about 200 a concentration of at least 10% by weight of the aqueous phase of said drilling fluid, an organic cationic material such as salts of choline or an organic salt of potassium, a filtration control agent, a viscosifier and water.

U.S. Pat. No. 5,908,814 teaches the use of drilling fluid additives that suppress clay selling within a subterranean well and to methods for controlling clay selling during the conventional drilling of a subterranean well. This conventional drilling fluid is comprised of a weight material (barite, hematite, iron oxide, calcium carbonate, magnesium carbonate, and combination thereof), an anionic polymer, and a reaction product of a tertiary amine and an compound having the formula R—X, where R is an alkyl group having up to four carbon atoms, and X is a halogen selected from the group consisting of chlorine, bromine, iodine, or combinations thereof. The tertiary amine has the formula $NR_1R_2R_3$ where $R_1$ and $R_2$ are methyl or hydroxyalkyl groups with one to three carbon atoms, or combinations thereof, and $R_3$ is a hydroxyalkyl group with one to three carbon atoms.

U.S. Pat. No. 6,247,543 teaches the use of a conventional drilling fluid for use in drilling wells through a formation containing a shale, which swells in the presence of water, where the drilling fluid includes an aqueous based continuous phase, a weight material, and a shale hydration inhibition agent having the formula: $H_2N-CH(CH_3)CH_2[-OHCH_2CH(CH_3)-]_x-NH_2$ a shale hydration inhibition agent, where the shale hydration inhibition agent is present in sufficient concentration to reduce the swelling of the shale.

Although drilling fluids have been developed with shale hydration inhibitors, there is still a need in the art for drilling fluids, especially drilling fluids for under-balanced drilling, that reduce the swelling tendency of reactive shale and/or clay.

SUMMARY OF THE INVENTION

The present invention provides a shale and/or clay anti-swelling additive for aqueous-based, under-balancing drilling fluids including a choline salt (a 2-hydroxyethyl trimethylammonium salt), where the choline salt reduces a swelling tendency of reactive shale and/or clay during under-balanced drilling operations.

The present invention also provides an aqueous-based, under-balanced drilling fluid including an effective amount of a choline salt (a 2-hydroxyethyl trimethylammonium salt), where the effective amount of the choline salt reduces a swelling tendency of reactive shale and/or clay during under-balanced drilling operations.

The present invention provides a method for under-balanced drilling including the step of circulating an aqueous-based, drilling fluid during under-balanced drilling operations, where the drilling fluid includes an effective amount of a choline salt, where the effective amount of the choline salt reduces a swelling tendency of reactive shale and/or clay during under-balanced drilling operations.

The present invention also provides a method for under-balanced drilling including the steps of drilling a borehole and circulating an aqueous-based, drilling fluid during under-balanced drilling operations, where the drilling fluid includes an effective amount of a choline salt, where the effective amount of the choline salt reduces a swelling tendency of reactive shale and/or clay during under-balanced drilling operations.

The present invention provides a shale and/or clay anti-swelling additive for aqueous-based, drilling fluids, fracturing fluids, completion fluids and production fluids including a choline carboxylate (a 2-hydroxyethyl trimethylammonium carboxylate), where the choline carboxylate reduces a swelling tendency of reactive shale and/or clay during drilling, fracturing, completion or production operations.

The present invention provides a method for drilling including the step of circulating an aqueous-based, drilling fluid while drilling, where the fluid includes an effective amount of a choline carboxylate, where the effective amount of the choline carboxylate reduces a swelling tendency of reactive shale and/or clay during drilling operations.

The present invention also provides a method for drilling a well borehole including the steps of drilling a borehole and circulating an aqueous-based, drilling fluid including an effective amount of a choline carboxylate, where the effective amount of the choline carboxylate reduces a swelling tendency of reactive shale and/or clay during drilling operations.

The present invention provides a method for fracturing a formation including the step of injecting an aqueous-based, fracturing fluid into a formation, where the fluid includes an effective amount of a choline salt sufficient to facilitate formation fracturing and to reduce a swelling tendency of reactive shale and/or clay during fracturing operations.

The present invention also provides a method for completing a well including the steps of circulating an aqueous-based, completion fluid in the well, where the fluid includes an effective amount of a choline carboxylate sufficient to reduce a swelling tendency of reactive shale and/or clay during completion operations.

The present invention also provides a method for production of a well including the steps of injecting an aqueous-based, production fluid into a well to aid in oil and/or gas production, where the fluid includes an effective amount of a choline carboxylate sufficient to reduce a swelling tendency of reactive shale and/or clay during completion operations.

The present invention also provides a general purpose fluid for use in oil and gas drilling, production, fracturing and completion operations, where the fluid is substantially clear or includes substantially no solids or solid forming ingredients and includes a choline salt, a foaming agent or weight reduction agent, a corrosion inhibitor and water. The choline salt is present in an amount sufficient to reduce reactive clay and/or shale swelling. The foaming agent is present in an amount sufficient to reduce the fluid weight when the fluid is mixed with a gas to form a foam. The corrosion inhibitor is present in an amount sufficient to reduce corrosion of downhole components and the choline salt does not adversely affect the corrosion inhibiting properties of the corrosion inhibitor.

DEFINITIONS

An under-balanced and/or managed pressure drilling fluid means a drilling fluid having a hydrostatic density (pressure) lower or equal to a formation density (pressure). For example, if a known formation at 10,000 ft (True Vertical Depth—TVD) has a hydrostatic pressure of 5,000 psi or 9.6 lbm/gal, an under-balanced drilling fluid would have a hydrostatic pressure less than or equal to 9.6 lbm/gal. Most under-balanced and/or managed pressure drilling fluids include at least a density reduction additive. Other additive many include a corrosion inhibitor, a pH modifier and a shale inhibitor.

The following definitions are provided in order to aid those skilled in the art in understanding the detailed description of the present invention.

The term "amphoteric" refers to surfactants that have both positive and negative charges. The net charge of the surfactant can be positive, negative, or neutral, depending on the pH of the solution.

The term "anionic" refers to those viscoelastic surfactants that possess a net negative charge.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.

The term "proppant" refers to a granular substance suspended in the fracturing fluid during the fracturing operation, which serves to keep the formation from closing back down upon itself once the pressure is released. Proppants envisioned by the present invention include, but are not limited to, conventional proppants familiar to those skilled in the art such as sand, 20-40 mesh sand, resin-coated sand, sintered bauxite, glass beads, and similar materials.

The abbreviation "RPM" refers to relative permeability modifiers.

The term "surfactant" refers to a soluble, or partially soluble compound that reduces the surface tension of liquids, or reduces inter-facial tension between two liquids, or a liquid and a solid by congregating and orienting itself at these interfaces.

The term "viscoelastic" refers to those viscous fluids having elastic properties, i.e., the liquid at least partially returns to its original form when an applied stress is released.

The phrase "viscoelastic surfactants" or "VES" refers to that class of compounds which can form micelles (spherulitic, anisometric, lamellar, or liquid crystal) in the presence of counter ions in aqueous solutions, thereby imparting viscosity to the fluid. Anisometric micelles in particular are preferred, as their behavior in solution most closely resembles that of a polymer.

The abbreviation "VAS" refers to a Viscoelastic Anionic Surfactant, useful for fracturing operations and frac packing. As discussed herein, they have an anionic nature with preferred counterions of potassium, ammonium, sodium, calcium or magnesium.

DETAILED DESCRIPTION OF THE INVENTION

The inventor has found that choline salts are surprisingly effective anti-swelling drilling fluid additives for under-balanced and/or managed pressure drilling operations, where it inhibits a swelling of reactive shale and/or clay which can cause significant problems in drilling operations, especially in under-balanced or managed pressure drilling operations.

The present invention broadly relates to a method for under-balanced or managed pressure drilling including the step of circulating an aqueous-based, drilling fluid during under-balanced drilling operations, where the drilling fluid includes an effective amount of a choline salt (a 2-hydroxyethyl trimethylammonium salt), where the effective amount of choline salt reduces a swelling tendency of reactive shale and/or clay during under-balanced or managed pressure drilling operations.

The present invention also broadly relates to a shale and/or clay anti-swelling additive for aqueous-based, under-balancing or managed pressure drilling fluids including a choline salt, where the choline salt reduces a swelling tendency of reactive shale and/or clay during under-balanced drilling operations.

The present invention also broadly relates to an aqueous-based drilling fluid including an effective amount of a choline salt (a 2-hydroxyethyl trimethylammonium salt), where the effective amount of choline salt reduces a swelling tendency of reactive shale and/or clay during under-balanced drilling operations, especially relating to under-balanced or managed pressure drilling fluids. The under-balanced drilling fluids include at least water, a density reduction additive, and an effective amount of choline salt, where the effective amount of choline salt reduces a swelling tendency of reactive shale and/or clay during under-balanced drilling operations. Other additives may also be included such as a corrosion inhibitor, a pH modifier, a shale inhibitor, an $H_2S$ scavenger, a $CO_2$ scavenger, etc. or combination thereof.

In one preferred embodiment of the drilling fluids of this invention, the drilling fluids are designed for under-balanced or managed pressure drilling, completion, production or related operations performed in an under-balanced or managed pressure condition include from about 0.1% v/v to about 10.0% v/v of a foamer or other density reduction additive, from about 0.1% v/v to about 5% v/v of a corrosion inhibitor, from about 0.1% v/v to about 10.0% v/v of a choline salt solution and the remainder being water, where the choline salt solution is generally about 70 wt. % of the choline salt with remainder being water. Generally, the resulting drilling fluid is pH adjusted by the addition of a sufficient amount of pH modifier to adjust the pH to about 10.5. A preferred embodiment of the drilling fluids of this invention includes from about 0.2% v/v to about 5.0% v/v of a foamer or other density reduction additive, from about 0.1% v/v to about 2.0% v/v of a corrosion inhibitor, from about 0.1% v/v to about 5.0% v/v of a choline salt solution and the remainder being water, where the choline salt solution is generally about 70 wt. % of the choline salt with remainder being water. Another preferred embodiment of the drilling fluids of this invention includes from about 0.2% v/v to about 4.0% v/v of a foamer or other density reduction additive, from about 0.1% v/v to about 1.0% v/v of a corrosion inhibitor, from about 0.1% v/v to about 3.0% v/v of a choline salt solution and the remainder being water, where the choline salt solution is generally about 70 wt. % of the choline salt with remainder being water.

One preferred class of choline salts of this invention is given by the general formula (I):

$$HOCH_2CH_2N^+(CH_3)_3 \cdot R^1COO^- \qquad (I)$$

where $R^1$ is an alkyl group, alkenyl group, alkynyl group, an aryl group, an alkaryl group, an aralkyl group, alkenylaryl group, aralkenyl group, alkynylaryl group, aralkynyl group hetero atom analogs, where the hetero atom is selected from the group consisting of boron, nitrogen, oxygen, fluorine, phosphorus, sulfur, chlorine, bromine, iodine, and mixture or combinations thereof, or mixtures or combinations thereof. The choline carboxylates are not only ideally suited for under-balanced drilling, completion, and production application, the choline carboxylates are ideally suited for all other drilling, completion, production, recovering or other oil field related operations. Thus, the choline carboxylates can be used in over-balanced drilling, completion and production operations. The choline carboxylates can also be used in foam applications to lighten the producing column weight to increase production efficiencies. The choline carboxylates of this invention are basically an all purpose anti-swelling additive for any oil or gas application where the borehole travels through a reactive shale or clay layer. But the choline carboxylates can also be used in other applications such as an additive in fracturing fluids. The choline carboxylates of this invention can be used with fluids through standard injection formats such as pumping the fluid from the surface or via newer techniques such as capillary tube injections used to enhance oil and gas production or to inject needed chemical agents into a well at one or more desired locations in the well.

While choline halides have been used in drilling, completion and production operations under over-balanced conditions, choline carboxylate salts have not been used in such applications. These new anti-swell additives should enjoy broad utility in all conventional drilling, completion and/or production fluids.

Suitable Reagents

Suitable choline salts or 2-hydroxyethyl trimethylammonium salts for use in this invention include, without limitation, choline organic counterion salts, choline inorganic counterion salts, or mixture or combinations thereof. Preferred choline counterion salts of this invention include, without limitation, choline or 2-hydroxyethyl trimethylammonium halide counterion salts, carboxylate counterion salts, nitrogen oxide counterion salts, phosphorus oxide counterion salts, sulfur oxide counterion salts, halogen oxide counterion salts, metal oxide counterion salts, carbon oxide counterion salts, boron oxide counterion salts, perfluoro counterion salts, hydrogen oxide counterion salts or mixtures or combinations thereof.

Exemplary examples of choline halide counterion salts including choline fluoride, choline chloride, choline bromide, choline iodide, or mixtures or combinations thereof.

Suitable choline carboxylate counterion salts include, without limitation, choline carboxylate counterion salts where the carboxylate counterion is of the general formula $R^1COO^-$, where $R^1$ is an alkyl group, alkenyl group, alkynyl group, an aryl group, an alkaryl group, an aralkyl group, alkenylaryl group, aralkenyl group, alkynylaryl group, aralkynyl group hetero atom analogs, where the hetero atom is selected from the group consisting of boron, nitrogen, oxygen, fluorine, phosphorus, sulfur, chlorine, bromine, iodine, and mixture or combinations thereof, or mixtures or combinations thereof. A non-exhaustive list of exemplary examples of choline carboxylate counterion salts include choline formate, choline acetate, choline propanate, choline butanate, cholide pentanate, choline hexanate, choline heptanate, choline octanate, choline nonanate, choline decanate, choline undecanate, choline dodecanate, and choline higher linear carboxylate salts, choline benzoate, choline salicylate, other choline aromatic carboxylate counterion salts, choline stearate, choline oleate, other choline fatty acid counterion salts, choline glyolate, choline lactate, choline hydroxylacetate, choline citrate, other choline hydroxylated carboxylates counterion salts, choline aconitate, choline cyanurate, choline oxalate, choline tartarate, choline itaconate, other choline di, tri and polycarboxylate counterion salts, choline trichloroacetate, choline trifluoroacetate, other choline halogenated carboxylate counterion salts, or mixture or combinations thereof. Other choline carboxylate counterion salts useful in the drilling fluids of this invention include choline amino acid counterion salts including choline salts of all naturally occurring and synthetic amino acids such as alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, (R)-Boc-4-(4-pyridyl)-β-Homoala-OH purum, (S)-Boc-4-(4-pyridyl)-β-Homoala-OH purum, (R)-Boc-4-trifluoromethyl-β-Homophe-OH purum, (S)-Fmoc-3-trifluoromethyl-β-Homophe-OH purum, (S)-Boc-3-trifluoromethyl-β-Homophe-OH purum, (S)-Boc-2-trifluoromethyl-β-Homophe-OH purum, (S)-Fmoc-4-chloro-β-Homophe-OH purum, (S)-Boc-4-methyl-β-Homophe-OH purum, 4-(Trifluoromethyl)-L-phenylalanine purum, 2-(Trifluoromethyl)-D-phenylalanine purum, 4-(Trifluoromethyl)-D-phenylalanine purum, 3-(2-Pyridyl)-L-alanine purum, 3-(2-Pyridyl)-L-alanine purum, 3-(3-Pyridyl)-L-alanine purum, or mixtures or combinations thereof or mixtures or combinations of these amino acid choline salts with other choline salts. Other preferred carboxylate counterions are counterions formed from a reaction of a carboxylic acid or carboxylate salt with an alkylene oxide to form a carboxylate polyalkylene oxide alkoxide counterion salt. Preferred alkylene oxides include ethylene oxide, propylene oxide, butylene oxide, and mixtures and/or combinations thereof.

Exemplary examples of choline nitrogen oxide counterion salts including choline nitrate, choline nitrite, choline $N_xO_y$ counterion salts or mixtures or combinations thereof.

Exemplary examples of choline phosphorus oxide counterion salts include choline phosphate, choline phosphite, choline hydrogen phosphate, choline dihydrogen phosphate, choline hydrogen phosphite, choline dihydrogen phosphite, or mixtures or combinations thereof.

Exemplary examples of choline sulfur oxide counterion salts include choline sulfate, choline hydrogen sulfate, choline persulfate, choline alkali metal sulfates, choline alkaline earth metal sulfates, choline sulfonate, choline alkylsulfonates, choline sulfamate ($NH_2SO_3^-$), choline taurinate ($NH_2CH_2CH_2SO_3^-$), or mixtures or combinations thereof.

Exemplary examples of choline halogen oxide counterion salts including choline chlorate, choline bromate, choline iodate, choline perchlorate, choline perbromate, choline periodate, or mixtures or combinations thereof.

Exemplary examples of choline metal oxide counterion salts including choline dichromate, choline iron citrate, choline copper citrate, choline iron oxalate, choline iron sulfate, choline tetrathiocyanatodiamminechromate, choline tetrathiomolybdate, or mixtures or combinations thereof.

Exemplary examples of choline carbon oxide counterion salts include choline carbonate, choline bicarbonate, choline alkali carbonates, choline alkaline earth metal carbonates, or mixtures or combinations thereof.

Exemplary examples of choline boron oxide counterion salts including choline borate, tetraphenyl borate, or mixtures or combinations thereof.

Exemplary examples of choline perfluoro counterion salts including choline tetrafluoroborate, choline hexafluoroantimonate, choline heptafluorotantalate(V), choline hexafluorogermanate(IV), choline hexafluorophsophate, choline hexafluorosilicate, choline hexafluorotitanate, choline metavanadate, choline metatungstate, choline molybdate, choline phosphomolybdate, choline trifluoroacetate, choline trifluoromethanesulfonate, or mixtures or combinations thereof.

Exemplary examples of choline hydrogen oxide counterion salts including choline hydroxide, choline peroxide, choline superoxide, mixtures or combinations thereof.

hydroxide reacted with: formic acid; acetic acid; phosphoric acid; hydroxy acetic acid; nitric acid; nitrous acid; poly phos; derivatives of $P_2O_5$; acid; (acid of glyoxal); sulfuric; all the amino acids (lycine, torine, glycine, etc.); $NH_2CH_2CH_2SO_3H$; sulfamic; idodic; all the fatty acids; diamethylol proprionic acid; cyclolaucine; phosphorous; boric; proline; benzoic acid; tertiary chloro acetic; fumeric; salicylic; choline derivatives; ethylene oxide; propylene oxide; butylene oxide; epilene chloro hydrine; ethylene chloro hydrine; choline carbonate; and choline peroxide.

pH Modifiers

Suitable pH modifiers for use in this invention include, without limitation, alkali hydroxides, alkali carbonates, alkali bicarbonates, alkaline earth metal hydroxides, alkaline earth metal carbonates, alkaline earth metal bicarbonates, rare earth metal carbonates, rare earth metal bicarbonates, rare earth metal hydroxides, amines, hydroxylamines ($NH_2OH$), alkylated hydroxyl amines ($NH_2OR$, where R is a carbyl group having from 1 to about 30 carbon atoms or heteroatoms —O or N), and mixtures or combinations thereof. Preferred pH modifiers include NaOH, KOH, $Ca(OH)_2$, CaO, $Na_2CO_3$, $KHCO_3$, $K_2CO_3$, $NaHCO_3$, MgO, $Mg(OH)_2$ and mixtures or combinations thereof. Preferred amines include triethylamine, triproplyamine, other trialkylamines, bis hydroxyl ethyl ethylenediamine (DGA), bis hydroxyethyl diamine 1-2 dimethylcyclohexane, or the like or mixtures or combinations thereof.

Weight Reducing Agents and Foamers

The weight reducing agents and foamers use for this invention include, without limitation, any weight reducing agent or foamer currently available or that will be come available during the life time of this patent application or patent maturing therefrom. Preferred foamers are those available from Weatherford International, Inc. facility in Elmendorf, Tex. Generally, the foamers used in this invention can include alone or in any combination an anionic surfactant, a cationic surfactant, a non-ionic surfactant and a zwitterionic surfactant. Preferred foaming agents includes those disclosed in co-pending U.S. patent application Ser. No. 10/839,734 filed May 5, 2004.

Corrosion Inhibitors

Suitable corrosion inhibitor for use in this invention include, without limitation: quaternary ammonium salts e.g., chloride, bromides, iodides, dimethylsulfates, diethylsulfates, nitrites, bicarbonates, carbonates, hydroxides, alkoxides, or the like, or mixtures or combinations thereof; salts of nitrogen bases; or mixtures or combinations thereof. Exemplary quaternary ammonium salts include, without limitation, quaternary ammonium salts from an amine and a quaternarization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, C6 to C24 synthetic tertiary amines, amines derived from natural products such as coconuts, or the like, dialkylsubstituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: C1 to C8 monocarboxylic acids such as formic acid, acetic acid, propanoic acid, butanoic acid, pentanoic acid, hexanoic acid, heptanoic acid, octanoic acid, 2-ethylhexanoic acid, or the like; C2 to C12 dicarboxylic acids, C2 to C12 unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof; fatty acid pyrimidines; monoimidazolines of EDA, DETA or higher ethylene amines, hexamethylene diamine (HMDA), tetramethylenediamine (TMDA), and higher analogs thereof; bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of poly amines such as TMDA, HMDA and 1,2-diaminocyclohexane; TGA salt of imidazoline derived from DETA with tall oil fatty acids or soy bean oil, canola oil, or the like; or mixtures or combinations thereof.

Other Additives

The drilling fluids of this invention can also include other additives as well such as scale inhibitors, carbon dioxide control additives, paraffin control additives, oxygen control additives, or other additives.

Scale Control

Suitable additives for Scale Control and useful in the compositions of this invention include, without limitation: Chelating agents, e.g., Na, K or $NH_4^+$ salts of EDTA; Na, K or $NH_4^+$ salts of NTA; Na, K or $NH_4^+$ salts of Erythorbic acid; Na, K or $NH_4^+$ salts of thioglycolic acid (TGA); Na, K or $NH_4^+$ salts of Hydroxy acetic acid; Na, K or $NH_4^+$ salts of Citric acid; Na, K or $NH_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxythylidene diphosphoric acid), PBTC (phosphoisobutane, tricarboxylic acid), Amino phosphonates of: MEA (monoethanolamine), $NH_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof; Phosphate esters, e.g., polyphosphoric acid esters or phosphorus pentoxide ($P_2O_5$) esters of: alkanol amines such as MEA, DEA, triethanol amine (TEA), Bishydroxyethylethylene diamine; ethoxylated alcohols, glycerin, glycols such as EG (ethylene glycol), propylene glycol, butylene glycol, hexylene glycol, trimethylol propane, pentaeryithrol, neopentyl glycol or the like; Tris & Tetrahydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy proplyamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, DOW AMP-90™, Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation: Cellosolves available from DOW Chemicals Company; Cellosolve acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methyl esters of fatty acids; low molecular weight quaternary ammonium chlorides of coconut oils soy oils or C 10 to C24 amines ormonohalogenated alkyl and aryl chlorides; quanternaryammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) de-aeration of the fluid prior to downhole injection, (2) addition of normal sulfides to product sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Exemplary examples oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Salt Inhibitors

Suitable salt inhibitors for use in the fluids of this invention include, without limitation, Na Minus-Nitrilotriacetamide available from Clearwater International, LLC of Houston, Tex.

Advantages of the Anti-Swelling Additives of this Invention

The present invention differs from the compositions and methods of U.S. Pat. No. 5,635,458 in that this patent teaches the use of choline chloride in a convention drilling fluid. Unlike under-balanced drilling fluids, convention drilling fluid or so-called over-balanced drilling fluids drill through a reservoir at hydrostatic pressures higher than the hydrostatic pressures of the formation and require filtration control agents and viscosifiers. These two components in conjunction with a weighing agent are required to establish an impermeable filter-cake on face of the formation preventing losses of the drilling fluid to the formation. In under-balanced drilling, these components are not required since the hydrostatic formation pressure is higher than the hydrostatic pressure of the drilling fluid because no filter-cake need be established and no or very little of the drilling fluid penetrates the formation.

The present invention differs from the compositions and methods of U.S. Pat. No. 5,908,814, as is in U.S. Pat. No. 5,635,458, where it teaches the use of choline chloride in conventional over-balanced drilling fluid. U.S. Pat. No. 6,247,543 also teaches the use of choline chloride in conventional over-balanced drilling fluid.

Fracturing Fluids

Generally, a hydraulic fracturing treatment involves pumping a proppant-free viscous fluid, or pad, usually water with some fluid additives to generate high viscosity, into a well faster than the fluid can escape into the formation so that the pressure rises and the rock breaks, creating artificial fracture and/or enlarging existing fracture. After fracturing the formation, a propping agent such as sand is added to the fluid to form a slurry that is pumped into the newly formed fractures in the formation to prevent them from closing when the pumping pressure is released. The proppant transport ability of a base fluid depends on the type of viscosifying additives added to the water base.

Water-base fracturing fluids with water-soluble polymers added to make a viscosified solution are widely used in the art of fracturing. Since the late 1950s, more than half of the fracturing treatments are conducted with fluids comprising guar gums, high-molecular weight polysaccharides composed of mannose and galactose sugars, or guar derivatives such as hydropropyl guar (HPG), hydroxypropylcellulose (HPC), carboxymethyl guar (CMG). carboxymethylhydropropyl guar (CMHPG). Crosslinking agents based on boron, titanium, zirconium or aluminum complexes are typically used to increase the effective molecular weight of the polymer and make them better suited for use in high-temperature wells.

To a lesser extent, cellulose derivatives such as hydroxyethylcellulose (HEC) or hydroxypropylcellulose (HPC) and carboxymethylhydroxyethylcellulose (CMHEC) are also used, with or without crosslinkers. Xanthan and scleroglucan, two biopolymers, have been shown to have excellent proppant-suspension ability even though they are more expensive than guar derivatives and therefore used less frequently. Polyacrylamide and polyacrylate polymers and copolymers are used typically for high-temperature applications or friction reducers at low concentrations for all temperatures ranges.

Polymer-free, water-base fracturing fluids can be obtained using viscoelastic surfactants. These fluids are normally prepared by mixing in appropriate amounts of suitable surfactants such as anionic, cationic, nonionic and zwitterionic surfactants. The viscosity of viscoelastic surfactant fluids is attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

Cationic viscoelastic surfactants—typically consisting of long-chain quaternary ammonium salts such as cetyltrimethylammonium bromide (CTAB)—have been so far of primarily commercial interest in wellbore fluid. Common reagents that generate viscoelasticity in the surfactant solutions are salts such as ammonium chloride, potassium chloride, sodium chloride, sodium salicylate and sodium isocyanate and non-ionic organic molecules such as chloroform. The electrolyte content of surfactant solutions is also an important control on their viscoelastic behavior. Reference is made for example to U.S. Pat. No. 4,695,389, U.S. Pat. No. 4,725,372, U.S. Pat. No. 5,551,516, U.S. Pat. No. 5,964,295, and U.S. Pat. No. 5,979,557. However, fluids comprising this type of cationic viscoelastic surfactants usually tend to lose viscosity at high brine concentration (10 pounds per gallon or more). Therefore, these fluids have seen limited use as gravel-packing fluids or drilling fluids, or in other applications requiring heavy fluids to balance well pressure. Anionic viscoelastic surfactants are also used.

It is also known from International Patent Publication WO 98/56497, to impart viscoelastic properties using amphoteric/zwitterionic surfactants and an organic acid, salt and/or inorganic salt. The surfactants are for instance dihydroxyl alkyl glycinate, alkyl ampho acetate or propionate, alkyl betaine, alkyl amidopropyl betaine and alkylamino mono- or di-propionates derived from certain waxes, fats and oils. The surfactants are used in conjunction with an inorganic water-soluble salt or organic additives such as phthalic acid, salicylic acid or their salts. Amphoteric/zwitterionic surfactants, in particular those comprising a betaine moiety are useful at temperature up to about 150° C. and are therefore of particular interest for medium to high temperature wells. However, like the cationic viscoelastic surfactants mentioned above, they are usually not compatible with high brine concentration.

According to a preferred embodiment of the invention, the treatment consists in alternating viscoelastic-base fluid stages (or a fluid having relatively poor proppant capacity, such as a polyacrylamide-based fluid, in particular at low concentration) with stages having high polymer concentrations. Preferably, the pumping rate is kept constant for the different stages but the proppant-transport ability may be also improved (or alternatively degraded) by reducing (or alternatively increasing) the pumping rate.

The proppant type can be sand, intermediate strength ceramic proppants (available from Carbo Ceramics, Norton Proppants, etc.), sintered bauxites and other materials known to the industry. Any of these base propping agents can further be coated with a resin (available from Santrol, a Division of Fairmount Industries, Borden Chemical, etc.) to potentially improve the clustering ability of the proppant. In addition, the proppant can be coated with resin or a proppant flowback control agent such as fibers for instance can be simultaneously pumped. By selecting proppants having a contrast in one of such properties such as density, size and concentrations, different settling rates will be achieved.

"Waterfrac" treatments employ the use of low cost, low viscosity fluids in order to stimulate very low permeability reservoirs. The results have been reported to be successful (measured productivity and economics) and rely on the mechanisms of asperity creation (rock spalling), shear displacement of rock and localized high concentration of proppant to create adequate conductivity. It is the last of the three mechanisms that is mostly responsible for the conductivity obtained in "waterfrac" treatments. The mechanism can be described as analogous to a wedge splitting wood.

Viscous well treatment fluids are commonly used in the drilling, completion, and treatment of subterranean formations penetrated by wellbores. A viscous well treatment fluid is generally composed of a polysaccharide or synthetic polymer in an aqueous solution which is crosslinked by an organometallic compound. Examples of well treatments in which metal-crosslinked polymers are used are hydraulic fracturing, gravel packing operations, water blocking, and other well completion operations.

Hydraulic fracturing techniques are widely employed to enhance oil and gas production from subterranean formations. During hydraulic fracturing, fluid is injected into a well bore under high pressure. Once the natural reservoir pressures are exceeded, the fracturing fluid initiates a fracture in the formation which generally continues to grow during pumping. As the fracture widens to a suitable width during the course of the treatment, a propping agent is then also added to the fluid. The treatment design generally requires the fluid to reach a maximum viscosity as it enters the fracture which affects the fracture length and width. The viscosity of most fracturing fluids is generated from water-soluble polysaccharides, such as galactomannans or cellulose derivatives. Employing crosslinking agents, such as borate, titanate, or zirconium ions, can further increase the viscosity. The gelled fluid may be accompanied by a propping agent (i.e., proppant) which results in placement of the proppant within the fracture thus produced. The proppant remains in the produced fracture to prevent the complete closure of the fracture and to form a conductive channel extending from the well bore into the formation being treated once the fracturing fluid is recovered.

In order for the treatment to be successful, it is preferred that the fluid viscosity eventually diminish to levels approaching that of water after the proppant is placed. This allows a portion of the treating fluid to be recovered without producing excessive amounts of proppant after the well is opened and returned to production. The recovery of the fracturing fluid is accomplished by reducing the viscosity of the fluid to a lower value such that it flows naturally from the formation under the influence of formation fluids. This viscosity reduction or conversion is referred to as "breaking" and can be accomplished by incorporating chemical agents, referred to as "breakers," into the initial gel.

Certain gels of fracturing fluids, such as those based upon guar polymers, undergo a natural break without the intervention of a breaking agent. However, the breaking time for such gelled fluids generally is excessive and impractical, being somewhere in the range from greater than 24 hours to in excess of weeks, months, or years depending on reservoir conditions. Accordingly, to decrease the break time of gels used in fracturing, chemical agents are usually incorporated into the gel and become a part of the gel itself. Typically, these agents are either oxidants or enzymes which operate to degrade the polymeric gel structure. Most degradation or "breaking" is caused by oxidizing agents, such as persulfate salts (used either as is or encapsulated), chromous salts, organic peroxides or alkaline earth or zinc peroxide salts, or by enzymes.

In addition to the importance of providing a breaking mechanism for the gelled fluid to facilitate recovery of the fluid and to resume production, the timing of the break is also of great importance. Gels which break prematurely can cause suspended proppant material to settle out of the gel before being introduced a sufficient distance into the produced fracture. Premature breaking can also lead to a premature reduction in the fluid viscosity, resulting in a less than desirable fracture width in the formation causing excessive injection pressures and premature termination of the treatment.

On the other hand, gelled fluids which break too slowly can cause slow recovery of the fracturing fluid from the produced fracture with attendant delay in resuming the production of formation fluids and severely impair anticipated hydrocarbon production. Additional problems may occur, such as the tendency of proppant to become dislodged from the fracture, resulting in at least partial closing and decreased efficiency of the fracturing operation. Preferably, the fracturing gel should begin to break when the pumping operations are concluded. For practical purposes, the gel preferably should be completely broken within about 24 hours after completion of the fracturing treatment. Gels useful in this regard include those disclosed in U.S. Pat. Nos. 3,960,736; 5,224,546; 6,756,345; and 6,793,018, incorporated herein by reference.

Fracturing fluid compositions of this invention comprise a solvent, a polymer soluble or hydratable in the solvent, a crosslinking agent, an inorganic breaking agent, an optional ester compound and a choline carboxylate. Preferably, the solvent includes water, and the polymer is hydratable in water. The solvent may be an aqueous potassium chloride solution. The inorganic breaking agent may be a metal-based oxidizing agent, such as an alkaline earth metal or a transition metal. The inorganic breaking agent may be magnesium peroxide, calcium peroxide, or zinc peroxide. The ester compound may be an ester of a polycarboxylic acid. For example, the ester compound may be an ester of oxalate, citrate, or ethylene diamine tetraacetate. The ester compound having hydroxyl groups can also be acetylated. An example of this is that citric acid can be acetylated to form acetyl triethyl citrate. A presently preferred ester is acetyl triethyl citrate. The hydratable polymer may be a water soluble polysaccharide, such as galactomannan, cellulose, or derivatives thereof. The crosslinking agent may be a borate, titanate, or zirconium-containing compound. For example, the crosslinking agent can be sodium borate×$H_2O$ (varying waters of hydration), boric acid, borate crosslinkers (a mixture of a titanate constituent, preferably an organotitanate constituent, with a boron constituent. The organotitanate constituent can be TYZOR® titanium chelate esters from E.I du Pont de Nemours & Company. The organotitanate constituent can be a mixture of a first organotitanate compound having a lactate base and a second organotitanate compound having triethanolamine base. The boron constituent can be selected from the group consisting of boric acid, sodium tetraborate, and mixtures thereof. These are described in U.S. Pat. No. 4,514,309.), borate based ores such as ulexite and colemanite, Ti(IV) acetylacetonate, Ti(IV) triethanolamine, Zr lactate, Zr triethanolamine, Zr lactate-triethanolamine, or Zr lactate-triethanolamine-triisopropanolamine. In some embodiments, the well treatment fluid composition may further comprise a proppant.

In another aspect, the invention relates to a well treatment fluid composition. The composition includes a solvent, a polymer soluble or hydratable in the solvent, a crosslinking agent, an alkaline earth metal or a transition metal-based breaking agent, an optional ester of a carboxylic acid and choline carboxylate. The breaking agent may be magnesium peroxide, calcium peroxide, or zinc peroxide. The solvent may include water, and the polymer is hydratable in water. The solvent may be an aqueous potassium chloride solution. The hydratable polymer may be a polysaccharide.

In still another aspect, the invention relates to a method of treating a subterranean formation. The method comprises: formulating a fracturing fluid comprising a solvent, a polymer soluble or hydratable in the solvent, a crosslinking agent, an inorganic breaking agent, a choline carboxylate and an optional ester compound; and injecting the fracturing fluid into a bore hole to contact at least a part of the formation by the fracturing fluid under a sufficient pressure to fracture the formation. The fracturing fluid has a viscosity that changes in response to a condition. The method may further comprise removing the fracturing fluid after the viscosity of the fracturing fluid is reduced. In some embodiments, the method may further comprise injecting a proppant into the formation. The proppant may be injected into the formation with the fracturing fluid. The fracturing fluid may have a pH at or above about 7. Preferably, the fracturing fluid should have a pH in the range of about 8 to about 12. The inorganic breaking agent may be a metal-based oxidizing agent. The metal may be an alkaline earth metal or a transition metal. The inorganic breaking agent may be magnesium peroxide, calcium peroxide, or zinc peroxide. The optional ester compound may be an ester of an polycarboxylic acid, such as an ester of oxalate, citrate, or ethylene diamine tetraacetate. Preferably, the solvent includes water, and the polymer is a water soluble polysaccharide, such as galactomannan, cellulose, or derivatives thereof. The solvent may be an aqueous potassium chloride solution. The crosslinking agent may be a borate, titanate, or zirconium-containing compound. The fracturing fluid can further comprise sodium thiosulfate.

Embodiments of the invention provide a well treatment fluid composition and a method of using the fluid composition to treat subterranean formations. The well treatment fluid composition can be used in hydraulic fracturing as a fracturing fluid, gravel packing operations, water blocking, temporary plugs for purposes of wellbore isolation and/or fluid loss control and other well completion operations. Most well treatment fluids are aqueous, although non-aqueous fluids may be formulated and used as well.

The well treatment fluid composition comprises a solvent (such as water), a polymer soluble or hydratable in the solvent, a crosslinking agent, an inorganic breaking agent, a choline carboxylate of and an optional ester compound. Optionally, the well treatment fluid composition may further include various other fluid additives, such as pH buffers, biocides, stabilizers, propping agents (i.e., proppants), mutual solvents, and surfactants designed to prevent emulsion with formation fluids, to reduce surface tension, to enhance load recovery, and/or to foam the fracturing fluid. The well treatment fluid composition may also contain one or more salts, such as potassium chloride, magnesium chloride, sodium chloride, calcium chloride, tetramethyl ammonium chloride, and mixtures thereof. It is found that a fracturing fluid made in accordance with embodiments of the invention exhibits reduced or minimal premature breaking and breaks completely or substantially completely after a well treatment is finished.

"Premature breaking" as used herein refers to a phenomenon in which a gel viscosity becomes diminished to an undesirable extent before all of the fluid is introduced into the formation to be fractured. Thus, to be satisfactory, the gel viscosity should preferably remain in the range from about 50% to about 75% of the initial viscosity of the gel for at least two hours of exposure to the expected operating temperature. Preferably the fluid should have a viscosity in excess of 100 centipoise (cP) at 100 sec$^{-1}$ while injection into the reservoir as measured on a Fann 50 C viscometer in the laboratory.

"Complete breaking" as used herein refers to a phenomenon in which the viscosity of a gel is reduced to such a level that the gel can be flushed from the formation by the flowing formation fluids or that it can be recovered by a swabbing operation. In laboratory settings, a completely broken, non-crosslinked gel is one whose viscosity is about 10 cP or less as measured on a Model 35 Fann viscometer having a R1B1 rotor and bob assembly rotating at 300 rpm.

An aqueous fracturing fluid may be prepared by blending a hydratable polymer with an aqueous base fluid. The base aqueous fluid can be, for example, water or brine. Any suitable mixing apparatus may be used for this procedure. In the case of batch mixing, the hydratable polymer and aqueous fluid are blended for a period of time which is sufficient to form a hydrated sol.

Suitable hydratable polymers that may be used in embodiments of the invention include any of the hydratable polysaccharides which are capable of forming a gel in the presence of a crosslinking agent. For instance, suitable hydratable polysaccharides include, but are not limited to, galactomannan gums, glucomannan gums, guars, derived guars, and cellulose derivatives. Specific examples are guar gum, guar gum derivatives, locust bean gum, Karaya gum, carboxymethyl cellulose, carboxymethyl hydroxyethyl cellulose, and hydroxyethyl cellulose. Presently preferred gelling agents include, but are not limited to, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art.

The hydratable polymer may be present in the fluid in concentrations ranging from about 0.10% to about 5.0% by weight of the aqueous fluid. A preferred range for the hydratable polymer is about 0.20% to about 0.80% by weight.

A suitable crosslinking agent can be any compound that increases the viscosity of the fluid by chemical crosslinking, physical crosslinking, or any other mechanisms. For example, the gellation of a hydratable polymer can be achieved by crosslinking the polymer with metal ions including boron, zirconium, and titanium containing compounds, or mixtures thereof. One class of suitable crosslinking agents is organotitanates. Another class of suitable crosslinking agents is borates as described, for example, in U.S. Pat. No. 4,514,309. The selection of an appropriate crosslinking agent depends upon the type of treatment to be performed and the hydratable polymer to be used. The amount of the crosslinking agent used also depends upon the well conditions and the type of treatment to be effected, but is generally in the range of from about 10 ppm to about 1000 ppm of metal ion of the crosslinking agent in the hydratable polymer fluid. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

The pH of an aqueous fluid which contains a hydratable polymer can be adjusted if necessary to render the fluid compatible with a crosslinking agent. Preferably, a pH adjusting material is added to the aqueous fluid after the addition of the polymer to the aqueous fluid. Typical materials for adjusting the pH are commonly used acids, acid buffers, and mixtures of acids and bases. For example, sodium bicarbonate, potassium carbonate, sodium hydroxide, potassium hydroxide, and sodium carbonate are typical pH adjusting agents. Acceptable pH values for the fluid may range from neutral to basic, i.e., from about 5 to about 14. Preferably, the pH is kept neutral or basic, i.e., from about 7 to about 14, more preferably between about 8 to about 12.

The term "breaking agent" or "breaker" refers to any chemical that is capable of reducing the viscosity of a gelled fluid. As described above, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow into the well bore. This reduction in viscosity of the treating fluid is commonly referred to as "breaking". Consequently, the chemicals used to break the viscosity of the fluid is referred to as a breaking agent or a breaker.

There are various methods available for breaking a fracturing fluid or a treating fluid. Typically, fluids break after the passage of time and/or prolonged exposure to high temperatures. However, it is desirable to be able to predict and control the breaking within relatively narrow limits. Mild oxidizing agents are useful as breakers when a fluid is used in a relatively high temperature formation, although formation temperatures of 300° F. (149° C.) or higher will generally break the fluid relatively quickly without the aid of an oxidizing agent.

Examples of inorganic breaking agents for use in this invention include, but are not limited to, persulfates, percarbonates, perborates, peroxides, perphosphates, permanganates, etc. Specific examples of inorganic breaking agents include, but are not limited to, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, and so on. Additional suitable breaking agents are disclosed in U.S. Pat. Nos. 5,877,127; 5,649,596; 5,669,447; 5,624,886; 5,106,518; 6,162,766; and 5,807,812. In some embodiments, an inorganic breaking agent is selected from alkaline earth metal or transition metal-based oxidizing agents, such as magnesium peroxides, zinc peroxides, and calcium peroxides.

In addition, enzymatic breakers may also be used in place of or in addition to a non-enzymatic breaker. Examples of suitable enzymatic breakers such as guar specific enzymes, alpha and beta amylases, amyloglucosidase, aligoglucosidase, invertase, maltase, cellulase, and hemi-cellulase are disclosed in U.S. Pat. Nos. 5,806,597 and 5,067,566.

A breaking agent or breaker may be used "as is" or be encapsulated and activated by a variety of mechanisms including crushing by formation closure or dissolution by formation fluids. Such techniques are disclosed, for example, in U.S. Pat. Nos. 4,506,734; 4,741,401; 5,110,486; and 3,163,219.

Suitable ester compounds include any ester which is capable of assisting the breaker in degrading the viscous fluid in a controlled manner, i.e., providing delayed breaking initially and substantially complete breaking after well treatment is completed. An ester compound is defined as a compound that includes one or more carboxylate groups: R—COO—, wherein R is phenyl, methoxyphenyl, alkylphenyl, $C_1$-$C_{11}$ alkyl, $C_1$-$C_{11}$ substituted alkyl, substituted phenyl, or other organic radicals. Suitable esters include, but are not limited to, diesters, triesters, etc.

An ester is typically formed by a condensation reaction between an alcohol and an acid by eliminating one or more water molecules. Preferably, the acid is an organic acid, such as a carboxylic acid. A carboxylic acid refers to any of a family of organic acids characterized as polycarboxylic acids and by the presence of more than one carboxyl group. In additional to carbon, hydrogen, and oxygen, a carboxylic acid may include heteroatoms, such as S, N, P, B, Si, F, Cl, Br, and I. In some embodiments, a suitable ester compound is an ester of oxalic, malonic, succinic, malic, tartaric, citrate, phthalic, ethylenediaminetetraacetic (EDTA), nitrilotriacetic, phosphoric acids, etc. Moreover, suitable esters also include the esters of glycolic acid. The alkyl group in an ester that comes from the corresponding alcohol includes any alkyl group, both substituted or unsubstituted. Preferably, the alkyl group has one to about ten carbon atoms per group. It was found that the number of carbon atoms on the alkyl group affects the water solubility of the resulting ester. For example, esters made from $C_1$-$C_2$ alcohols, such as methanol and ethanol, have relatively higher water solubility. Thus, application temperature range for these esters may range from about 120° F. to about 250° F. (about 49° C. to about 121° C.). For higher temperature applications, esters formed from $C_3$-$C_{10}$ alcohols, such as n-propanol, butanol, hexanol, and cyclohexanol, may be used. Of course, esters formed from $C_{11}$ or higher alcohols may also be used. In some embodiments, mixed esters, such as acetyl methyl dibutyl citrate, may be used for high temperature applications. Mixed esters refer to those esters made from polycarboxylic acid with two or more different alcohols in a single condensation reaction. For example, acetyl methyl dibutyl citrate may be prepared by condensing citric acid with both methanol and butanol and then followed by acylation.

Specific examples of the alkyl groups originating from an alcohol include, but are not limited to, methyl, ethyl, propyl, butyl, iso-butyl, 2-butyl, t-butyl, benzyl, p-methoxybenzyl, m-methoxybenxyl, chlorobenzyl, p-chlorobenzyl, phenyl, hexyl, pentyl, etc. Specific examples of suitable ester compounds include, but are not limited to, triethyl phosphate, diethyl oxalate, dimethyl phthalate, dibutyl phthalate, diethyl maleate, diethyl tartrate, 2-ethoxyethyl acetate, ethyl acetylacetate, triethyl citrate, acetyl triethyl citrate, tetracyclohexyl EDTA, tetra-1-octyl EDTA, tetra-n-butyl EDTA, tetrabenzyl EDTA, tetramethyl EDTA, etc. Additional suitable ester compounds are described, for example, in the following U.S. Pat. Nos. 3,990,978; 3,960,736; 5,067,556; 5,224,546; 4,795,574; 5,693,837; 6,054,417; 6,069,118; 6,060,436; 6,035,936; 6,147,034; and 6,133,205.

When an ester of a polycarboxylic acid is used, total esterification of the acid functionality is preferred, although a partially esterified compound may also be used in place of or in addition to a totally esterified compound. In these embodiments, phosphate esters are not used alone. A phosphate ester refers to a condensation product between an alcohol and a phosphorus acid or a phosphoric acid and metal salts thereof. However, in these embodiments, combination of a polycarboxylic acid ester with a phosphate ester may be used to assist the degradation of a viscous gel.

When esters of polycarboxylic acids, such as esters of oxalic, malonic, succinic, malic, tartaric, citrate, phthalic, ethylenediaminetetraacetic (EDTA), nitrilotriacetic, and other carboxylic acids are used, it was observed that these esters assist metal based oxidizing agents (such as alkaline earth metal or zinc peroxide) in the degradation of fracturing fluids. It was found that the addition of 0.1 gal/Mgal (0.1 l/m$^3$)

to 5 gal/Mgal (5 l/m³) of these esters significantly improves the degradation of the fracturing fluid. More importantly, the degradation response is delayed, allowing the fracturing fluid ample time to create the fracture and place the proppant prior to the degradation reactions. The delayed reduction in viscosity is likely due to the relatively slow hydrolysis of the ester, which forms polycarboxylate anions as hydrolysis products. These polycarboxylate anions, in turn, improve the solubility of metal based oxidizing agents by sequestering the metal associated with the oxidizing agents. This may have promoted a relatively rapid decomposition of the oxidizing agent and caused the fracturing fluid degradation.

Generally, the temperature and the pH of a fracturing fluid affects the rate of hydrolysis of an ester. For downhole operations, the bottom hole static temperature ("BHST") cannot be easily controlled or changed. The pH of a fracturing fluid usually is adjusted to a level to assure proper fluid performance during the fracturing treatment. Therefore, the rate of hydrolysis of an ester could not be easily changed by altering BHST or the pH of a fracturing fluid. However, the rate of hydrolysis may be controlled by the amount of an ester used in a fracturing fluid. For higher temperature applications, the hydrolysis of an ester may be retarded or delayed by dissolving the ester in a hydrocarbon solvent. Moreover, the delay time may be adjusted by selecting esters that provide more or less water solubility. For example, for low temperature applications, polycarboxylic esters made from low molecular weight alcohols, such as methanol or ethanol, are recommended. The application temperature range for these esters could range from about 120° F. to about 250° F. (about 49° C. to about 121° C.). On the other hand, for higher temperature applications or longer injection times, esters made from higher molecular weight alcohols should preferably be used. The higher molecular weight alcohols include, but are not limited to, $C_3$-$C_6$ alcohols, e.g., n-propanol, hexanol, and cyclohexanol.

In some embodiments, esters of citric acid are used in formulating a well treatment fluid. A preferred ester of citric acid is acetyl triethyl citrate, which is available under the trade name Citraflex A2 from Morflex, Inc., Greensboro, N.C.

Propping agents or proppants are typically added to the fracturing fluid prior to the addition of a crosslinking agent. However, proppants may be introduced in any manner which achieves the desired result. Any proppant may be used in embodiments of the invention. Examples of suitable proppants include, but are not limited to, quartz sand grains, glass and ceramic beads, walnut shell fragments, aluminum pellets, nylon pellets, and the like. Proppants are typically used in concentrations between about 1 to 8 lbs. per gallon of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, and so on.

The well treatment fluid composition in accordance with embodiments of the invention has many useful applications. For example, it may be used in hydraulic fracturing, gravel packing operations, water blocking, temporary plugs for purposes of wellbore isolation and/or fluid loss control, and other well completion operations. One application of the fluid composition is to use it as a fracturing fluid. Accordingly, embodiments of the invention also provide a method of treating a subterranean formation. The method includes formulating a fracturing fluid comprising an aqueous fluid, a hydratable polymer, a crosslinking agent, an inorganic breaking agent, and an ester compound; and injecting the fracturing fluid into a bore hole to contact at least a part of the formation by the fracturing fluid under a sufficient pressure to fracture the formation. Initially, the viscosity of the fracturing fluid should be maintained above at least 200 cP at 40 sec⁻¹ during injection and, afterwards, should be reduced to less than 200 cP at 40 sec⁻¹. After the viscosity of the fracturing fluid is lowered to an acceptable level, at least a portion of the fracturing fluid is removed from the formation. During the fracturing process, a proppant can be injected into the formation simultaneously with the fracturing fluid. Preferably, the fracturing fluid has a pH around or above about 7, more preferably in the range of about 8 to about 12.

It should be understood that the above-described method is only one way to carry out embodiments of the invention. The following U.S. patents disclose various techniques for conducting hydraulic fracturing which may be employed in embodiments of the invention with or without modifications: U.S. Pat. Nos. 6,169,058; 6,135,205; 6,123,394; 6,016,871; 5,755,286; 5,722,490; 5,711,396; 5,551,516; 5,497,831; 5,488,083; 5,482,116; 5,472,049; 5,411,091; 5,402,846; 5,392,195; 5,363,919; 5,228,510; 5,074,359; 5,024,276; 5,005,645; 4,938,286; 4,926,940; 4,892,147; 4,869,322; 4,852,650; 4,848,468; 4,846,277; 4,830,106; 4,817,717; 4,779,680; 4,479,041; 4,739,834; 4,724,905; 4,718,490; 4,714,115; 4,705,113; 4,660,643; 4,657,081; 4,623,021; 4,549,608; 4,541,935; 4,378,845; 4,067,389; 4,007,792; 3,965,982; and 3,933,205.

The liquid carrier can generally be any liquid carrier suitable for use in oil and gas producing wells. A presently preferred liquid carrier is water. The liquid carrier can comprise water, can consist essentially of water, or can consist of water. Water will typically be a major component by weight of the fluid. The water can be potable or non-potable water. The water can be brackish or contain other materials typical of sources of water found in or near oil fields. For example, it is possible to use fresh water, brine, or even water to which any salt, such as an alkali metal or alkali earth metal salt ($NaCO_3$, NaCl, KCl, etc.) has been added. The liquid carrier is preferably present in an amount of at least about 80% by weight. Specific examples of the amount of liquid carrier include 80%, 85%, 90%, and 95% by weight. The carrier liquid can be a VAS gel.

The pH of the fluid can generally be any pH compatible with downhole formations. The pH is presently preferred to be about 6.5 to about 10.0. The pH can be about the same as the formation pH.

The surfactant can generally be any surfactant. The surfactant is preferably viscoelastic. The surfactant is preferably anionic. The anionic surfactant can be an alkyl sarcosinate. The alkyl sarcosinate can generally have any number of carbon atoms. Presently preferred alkyl sarcosinates have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms.

The anionic surfactant can have the chemical formula $R_1CON(R_2)CH_2X$, wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

The surfactant can generally be present in any weight percent concentration. Presently preferred concentrations of surfactant are about 0.1% to about 15% by weight. A presently more preferred concentration is about 0.5% to about 6% by weight. Laboratory procedures can be employed to determine the optimum concentrations for any particular situation.

The amphoteric polymer can generally be any amphoteric polymer. The amphoteric polymer can be a nonionic water-soluble homopolysaccharide or an anionic water-soluble polysaccharide. The polymer can generally have any molecular weight, and is presently preferred to have a molecular weight of at least about 500,000.

The polymer can be a hydrolyzed polyacrylamide polymer. The polymer can be a scleroglucan, a modified scleroglucan, or a scleroglucan modified by contact with glyoxal or glutaraldehyde. The scleroglucans are nonionic water-soluble homopolysaccharides, or water-soluble anionic polysaccharides, having molecular weights in excess of about 500,000, the molecules of which consist of a main straight chain formed of D-glucose units which are bonded by .beta.-1,3-bonds and one in three of which is bonded to a side D-glucose unit by means of a .beta.-1,6 bond. These polysaccharides can be obtained by any of the known methods in the art, such as fermentation of a medium based on sugar and inorganic salts under the action of a microorganism of Sclerotium type A. A more complete description of such scleroglucans and their preparations may be found, for example, in U.S. Pat. Nos. 3,301,848 and 4,561,985. In aqueous solutions, the scleroglucan chains are combined in a triple helix, which explains the rigidity of the biopolymer, and consequently its features of high viscosity-increasing power and resistance to shearing stress.

It is possible to use, as source of scleroglucan, the scleroglucan which is isolated from a fermentation medium, the product being in the form of a powder or of a more or less concentrated solution in an aqueous and/or aqueous-alcoholic solvent. Scleroglucans customarily used in applications in the petroleum field are also preferred according to the present invention, such as those which are white powders obtained by alcoholic precipitation of a fermentation broth in order to remove residues of the producing organism (mycelium, for example). Additionally, it is possible to use the liquid reaction mixture resulting from the fermentation and containing the scleroglucan in solution. According to the present invention, further suitable scleroglucans are the modified scleroglucan which result from the treatment of scleroglucans with a dialdehyde reagent (glyoxal, glutaraldehyde, and the like), as well as those described in U.S. Pat. No. 6,162,449 (.beta.-1,3-scleroglucans with a cross-linked 3-dimensional structure produced by Sclerotium rolfsii).

The polymer can be Aquatrol V (a synthetic compound which reduces water production problems in well production; described in U.S. Pat. No. 5,465,792), AquaCon (a moderate molecular weight hydrophilic terpolymer based on polyacrylamide capable of binding to formation surfaces to enhance hydrocarbon production; described in U.S. Pat. No. 6,228,812) and Aquatrol C (an amphoteric polymeric material). Aquatrol V, Aquatrol C, and AquaCon are commercially available from BJ Services Company.

The polymer can be a terpolymer synthesized from an anionic monomer, a cationic monomer, and a neutral monomer. The monomers used preferably have similar reactivities so that the resultant amphoteric polymeric material has a random distribution of monomers. The anionic monomer can generally be any anionic monomer. Presently preferred anionic monomers include acrylic acid, methacrylic acid, 2-acrylamide-2-methylpropane sulfonic acid, and maleic anhydride. The cationic monomer can generally be any cationic monomer. Presently preferred cationic monomers include dimethyl-diallyl ammonium chloride, dimethylamino-ethyl methacrylate, and allyltrimethyl ammonium chloride. The neutral monomer can generally be any neutral monomer. Presently preferred neutral monomers include butadiene, N-vinyl-2-pyrrolidone, methyl vinyl ether, methyl acrylate, maleic anhydride, styrene, vinyl acetate, acrylamide, methyl methacrylate, and acrylonitrile. The polymer can be a terpolymer synthesized from acrylic acid (AA), dimethyl diallyl ammonium chloride (DMDAC), and acrylamide (AM). The ratio of monomers in the terpolymer can generally be any ratio. A presently preferred ratio is about 1:1:1.

Another presently preferred amphoteric polymeric material (hereinafter "polymer 1") includes approximately 30% polymerized AA, 40% polymerized AM, and 10% polymerized DMDAC with approximately 20% free residual DMDAC which is not polymerized due to lower relative reactivity of the DMDAC monomer.

The fluid can further comprise one or more additives. The fluid can further comprise a base. The fluid can further comprise a salt. The fluid can further comprise a buffer. The fluid can further comprise a relative permeability modifier. The fluid can further comprise methylethylamine, monoethanolamine, triethylamine, triethanolamine, sodium hydroxide, potassium hydroxide, potassium carbonate, sodium chloride, potassium chloride, potassium fluoride, $KH_2PO_4$, or $K_2HPO_4$. The fluid can further comprise a proppant. Conventional proppants will be familiar to those skilled in the art and include sand, resin coated sand sintered bauxite and similar materials. The proppant can be suspended in the fluid.

Relative permeability modifiers can be added to the fluids to further improve water shut off properties. These compounds are polymers that are water-soluble and improve the leak-off viscosity of the fracturing fluid.

A specific example of a treating fluid is as follows: (a) 11% KCl by weight; (b) 2.5% surfactant by weight; (c) 1.6% buffer (potassium carbonate in water (45% by weight potassium carbonate)) by volume, and (d) 1.0% of 10% (by weight) Polymer 1 solution.

An additional embodiment of the invention involves the use of any of the above described fluids in a method of fracturing a subterranean formation. The method can comprise providing a fluid comprising a liquid carrier, a viscoelastic anionic surfactant, and an amphoteric polymer, pumping the fluid through a wellbore, and contacting the fluid and the subterranean formation to fracture the formation.

A further additional embodiment of the invention involves the use of any of the above described fluids in a method of reducing the amount of water produced from a subterranean oil producing formation. The method can comprise providing a fluid comprising a liquid carrier, a viscoelastic anionic surfactant, and an amphoteric polymer, pumping the fluid through a wellbore, contacting the fluid and the subterranean formation, and obtaining product from the formation. The weight percent of water in the product is less than the weight percent of water in product produced from a similar formation that was not contacted with the fluid. The fluid can further comprise a relative permeability modifier. The $C_w$ of the similar formation that was not treated with the fluid ("untreated $C_w$") is preferably greater than the $C_w$ of the formation treated with the fluid ("treated $C_w$"). The ratio of the untreated $C_w$ to the treated $C_w$ is preferably at least about 2, at least about 5, at least about 10, at least about 20, at least about 30, at least about 40, at least about 50, at least about 60, at least about 70, at least about 80, at least about 90, at least about 100, at least about 150, or at least about 200.

According to other embodiments of the invention, there is provided a fracturing fluid comprising anionic viscoelastic surfactants which viscosity and its leak-off viscosity can be enhanced while the fluid is injected in the pores of the rock, providing water shut off and favoring oil/gas flow and allowing non damaging polymers such as relative permeability modifiers to be included in the formulations without adversely affecting the gel viscosity but improving the gel filtration efficiency and its water control properties.

Some embodiments of the invention take advantage of the natural pH change at the formation rock to cause an increase in the gel viscosity at the formation pores to block water production, which is discussed herein. For example, in its use the fluid is designed for optimum viscosity at the same pH of the formation water/rock. However it is pumped at a pH that is lower or higher than the formation pH (0.3 to 1 unit) through a wellbore and into a surrounding formation having an aqueous zone and a hydrocarbon zone. The fluid is then allowed to contact the aqueous zone and the hydrocarbon zone. Contact with the hydrocarbon zone serves to thin the fluid since the surfactant gel is thinned by hydrocarbons. While contact with the water zone or water saturated pores will lower the gel pH to that of the formation increasing its viscoelasticity and viscosity. Additionally, if an RPM polymer is included in the formulation it will adhere to the water wet rock and induce a drag, or friction force on water, reinforcing the viscoelastic gel structure and also lubricating oil production, serving to preferentially block the flow of water from that portion of the formation. Consequently oil production is unaffected while water flow is preferentially shut off.

The amphoteric polymeric material is characterized by the presence of both positively and negatively charged components along the polymer chain. This nature of the polymeric material is believed to account for the polymeric material's ability to strongly bond to the formation while exhibiting a hydrophilic character capable of forming a strong hydrogen bond to water causing a drag or a higher friction pressure on water flowing through the capillaries or openings of the formation. By whatever mechanism, the mobility of formation water is greatly reduced by the amphoteric polymeric material without restricting the production of oil or gas to any appreciable extent.

Additional description of various embodiments of the invention are provided below. The description with respect to "well-treating solution", and "viscous fluid" is applicable, with or without modifications, to the well service fluid in accordance with embodiments of the invention. It should be noted that any number disclosed herein should be understood as to mean an approximate value, regardless of whether the word "about" or "approximate" is used in describing the number.

A presently preferred well treating solution for changing the relative permeability of a formation to water can be prepared by adding the amphoteric polymeric material to VAS carrier liquid with the amphoteric polymeric material being present at about 1.0% to about 10% by volume, depending upon the permeability.

The resulting treating solution can be injected into the formation at pumping rates and treating pressures above the fracture gradient of the formation. The volume of treating solution used is based on the desired fracture geometry, the thickness of the zone to be treated, the porosity of the formation being treated, and other factors.

The viscous fluids of the invention can be used for transporting particulate through a conduit to a subterranean location. In one form, the fluids comprise an aqueous base, a surfactant comprising an alkyl sarcosinate having from about 12 to about 24 carbon atoms and a buffer for adjusting the pH of the combined aqueous base and surfactant at or for the formation pH. The alkyl sarcosinate is preferably present at about 0.5% to about 10% by weight, based upon the weight of the total fluid. The pH of the viscous fluid is preferably adjusted with the buffer to about 6.5 to about 10.0 for most formations.

The viscous fluids of the invention can also include an additional source of anions in addition to those furnished by the surfactant. The additional source of anions can be a co-surfactant such as any ionic or anionic undiluted surfactant.

In the method of fracturing a subterranean formation of the invention, an aqueous base fluid is combined with a surfactant comprising an alkyl sarcosinate having from about 12 to about 24 carbon atoms. The combined fluid is buffered to thereby adjust the pH of the combined aqueous base and surfactant at or for the formation pH, thereby creating a viscous fluid capable of supporting proppant. The viscous fluid is pumped through a wellbore and into a surrounding formation at a pressure sufficient to fracture the formation.

The viscous fluids of the invention can also be used in a method for reducing the amount of water produced from a subterranean oil producing formation. An aqueous base fluid is combined with a surfactant comprising an alkyl sarcosinate having from about 12 to about 24 carbon atoms. The combined fluid is buffered to thereby adjust the pH of the combined aqueous base and surfactant sufficiently to produce a viscous fluid. The viscous fluid is pumped through a wellbore and into a surrounding formation having an aqueous zone and a hydrocarbon zone, the aqueous zone comprising water. The viscous fluid is then allowed to contact the aqueous zone and the hydrocarbon zone. Contact with the hydrocarbon zone serves to thin the viscous fluid while contact with the aqueous zone serves to preferentially block the flow of water from that portion of the formation.

The viscoelastic surfactant fluid is useful as a fracturing fluid with improved efficiency. Specifically, the use of this fluid in fracturing a formation will simultaneously enhance oil production while simultaneously drastically minimizing or completely stopping water production.

In a preferred form, the viscous fluids of the invention comprise water, a base, a surfactant comprising an alkyl sarcosinate having from about 12 to about 24 carbon atoms in the alkyl group, and a buffer for adjusting the pH, of the combined aqueous base and surfactant at or for the formation pH. As will be explained in detail, the fluids of the invention can be optimized for viscosity and for the formation pH in order to reduce ion exchange at the formation, thereby avoiding clay dispersion and swelling. The water used in formulating the fluids can be fresh water or light brines from any convenient source. The particularly preferred alkyl sarcosinates used as the surfactant have an alkyl group of about 14 to about 18 carbon atoms.

Sarcosine (N-methylglycine) is a naturally occurring amino acid found in starfish, sea urchins and crustaceans. It can be purchased from a variety of commercial sources, or alternately produced by a number of synthetic routes known in the art including thermal decomposition of caffeine in the presence of barium hydroxide (Arch. Pharm. 232: 601, 1894); (Bull. Chem. Soc. Japan, 39: 2535, 1966); and numerous others (T. Shirai in Synthetic Production and Utilization of Amino Acids; T. Kaneko, et al., Eds.; Wiley, New York: pp. 184-186, 1974). Sodium sarcosinate is manufactured commercially from formaldehyde, sodium cyanide and methyl amine (U.S. Pat. Nos. 2,720,540 and 3,009,954). The preferred sarcosinate are the condensation products of sodium sarcosinate and a fatty acid chloride. The fatty acid chloride is reacted with sodium sarcosinate under carefully controlled alkaline conditions (i.e., the Schotten-Bauman reaction) to produce the fatty sarcosinate sodium salt which is water soluble. Upon acidification, the fatty sarcosine acid, which is also water insoluble, is formed and may be isolated from the reaction medium. The acyl sarcosines may be neutralized with bases such as the salts of sodium, potassium, ammonia, or organic bases such as triethanolamine in order to produce aqueous solutions.

Another surfactant useful in the fluids of this invention are an anionic sarcosinate surfactant available commercially from BJ Services Company as "M-Aquatrol" (MA). The MA-1 sarcosinate is a viscous liquid surfactant with at least 94% oleoyl sarcosine. For hydraulic fracturing, a sufficient quantity of the sarcosinate is present in aqueous solution to provide sufficient viscosity to suspend proppant during placement. The surfactant is preferably present at about 0.5% to about 10% by weight, most preferably at about 0.5% to about 6% by weight, based upon the weight of the total fluid.

The surfactant can be added to an aqueous solution in which there is typically dissolved a quantity of at least one water soluble salt to effect formation stability. Typical water-soluble salts include potassium chloride, sodium chloride and the like. Formation stability is typically achieved with only small concentrations of salt. The water-soluble salts may be considered part of the "buffer" for adjusting the pH of the combined aqueous base and surfactant in the method of the present invention. The viscosity of the fluids of the invention are improved significantly by the addition of certain additional anions to the surfactant-laden solution. The pH can be adjusted, for example, by the addition of alkali metal, carbonate, phosphate or borate, or organic amines, especially alkanol amines such as mono-, di- or triethanolamine.

High temperature stability of the fluids in question is achieved if selecting specific anion, such as phosphate or fluoride ions instead of chlorides, preferably provided in the form of an inorganic phosphate or fluoride salt or a fluoride acid such as fluosilicic acid ($H_2SiF_6$). The fluoride salt concentration can be about 0.5% to about 10% by weight, and more preferably about 3% to about 7% by weight, based upon the total weight of the fluid. Typical fluoride salts include ammonium bifluoride and potassium fluoride. The pH of the surfactant-fluoride salt solution can be adjusted to about 6.5 to about 10. The pH can be adjusted with the same bases as discussed above.

Each salt will produce a peak viscosity at a different pH. The fluids of invention are optimized for viscosity and formation pH as will be discussed with respect to the laboratory analyses which follow.

In the method of fracturing a formation using the formulations of the invention, an aqueous base fluid is combined with an anionic surfactant comprising an alkyl sarcosinate having from about 12 to about 24 carbon atoms, and alternatively a viscoelastic polymer such as an RPM. Standard mixing procedures known in the art can be employed since heating of the solution or special agitation procedures are not normally required. The aqueous base has been buffered with a buffer to thereby adjust the pH of the combined aqueous base and surfactant above about 6.5, thereby creating a viscous fluid capable of supporting proppant. The proppant can be added and the viscous fluid can then be pumped through a wellbore and into a surrounding formation at a pressure sufficient to fracture the formation. Typically, the viscous fluid can be allowed to contact the formation for a period of tine sufficient to increase the viscosity in the water saturated pores, while in the oil pores it will thin immediately and therefore no breakers are required.

These effects cannot be easily achieved when cationic surfactants are used. Due to the fact that cationic surfactants are not pH dependent with regards to viscosity, their viscosity remains within a narrow, unadjustable range, thereby limiting their utility. The anionic surfactants of the present invention overcome this problem by being pH dependent with regards to viscosity, thereby allowing for their viscosity to be adjusted to the desired value by altering the pH appropriately.

The fluid of the present invention may also be used as asphaltene-dispersing agents. Asphaltenes are constituents of crude oils, usually present as colloidal dispersions stabilized by resins in the oil. While examples of asphaltene-dispersing agents are know in the art (e.g. U.S. Pat. No. 5,948,237), the sarcosinate anionic surfactant of the invention in combination with RPM type materials produces a synergistic effect in this regard. Specifically, these compounds in combination form an excellent asphaltene-dispersant, thereby aiding in the cleaning of rocks, pipes, valves, conveying devices, and the like by removing heavy oil deposits and asphaltenes themselves.

The fluids of the invention can also be used as selective water control additives. The viscous fluids can be pumped into a water rich sector of a producing interval. Once placed, the gel viscosity will prevent formation water flow through that portion of the reservoir. On the other hand, gel pumped into the oil rich sector of the formation reservoir will immediately thin on contact with the oil contained within the reservoir. Consequently, oil production will be uninhibited while water flow will be preferentially stopped or significantly reduced.

For fracturing applications, the fluids of the invention are typically pumped downhole at or slightly above the formation pH. Preferably, when the fluids of the invention are used for water control purposes, the fluids are pumped downhole at about 3/10 of a pH unit less or more than the formation material pH depending on the anion portion of the salt used as counter cation. The fluid is thus pumped in a thinned state, reducing the friction pressure of the pumping job. Upon contacting the formation material, the pH of the fluid increases, resulting in complete gellation of the fluid at the formation location rather than at the well surface.

Various amine oxides have been used as surfactants to create foams and remove "intrusion fluids from wellbores," according to U.S. Pat. No. 3,303,896 and they have been used as foam stabilizers, according to U.S. Pat. No. 3,317,430. Certain amine oxides have also been used in combination with quaternary ammonium compounds as foaming and silt suspending agents. See, for example, U.S. Pat. No. 4,108,782 and U.S. Pat. No. 4,113,631. The use of amine oxide surfactants for chemical flooding enhanced oil recovery was described in a topical report by David K. Olsen in NIPER-417 (August 1989) for work performed for the US Department of Energy under cooperative agreement DE-FC22-83FE60149 by the National Institute for Petroleum and Energy Research. However, to Applicants' knowledge, the amine oxides have not been used to improve the properties of fracturing fluids and to promote rapid cleanup, or to enhance well production from a well stimulated by hydraulic fracturing.

Hydraulic fracturing of subterranean formations has long been established as an effective means to stimulate the production of hydrocarbon fluids from a wellbore. In hydraulic fracturing, a well stimulation fluid (generally referred to as a fracturing fluid or a "frac fluid") is injected into and through a wellbore and against the surface of a subterranean formation penetrated by the wellbore at a pressure at least sufficient to create a fracture in the formation. Usually a "pad fluid" is injected first to create the fracture and then a fracturing fluid, often bearing granular propping agents, is injected at a pressure and rate sufficient to extend the fracture from the wellbore deeper into the formation. If a proppant is employed, the goal is generally to create a proppant filled zone (aka, the proppant pack) from the tip of the fracture back to the wellbore. In any event, the hydraulically induced fracture is more permeable than the formation and it acts as a pathway or conduit for the hydrocarbon fluids in the formation to flow to the wellbore and then to the surface where they are collected. The methods of fracturing are well known and they may be varied to meet the user's needs, but most follow this general procedure (which is greatly overly simplified).

The fluids used as fracturing fluids have also been varied, but many if not most are aqueous based fluids that have been "viscosified" or thickened by the addition of a natural or synthetic polymer (cross-linked or uncross-linked). The carrier fluid is usually water or a brine (e.g., dilute aqueous solutions of sodium chloride and/or potassium chloride). The viscosifying polymer is typically a solvatable (or hydratable) polysaccharide, such as a galactomannan gum, a glycomannan gum, or a cellulose derivative. Examples of such polymers include guar, hydroxypropyl guar, carboxymethyl guar, carboxymethylhydroxyethyl guar, hydroxyethyl cellulose, carboxymethyl-hydroxyethyl cellulose, hydroxypropyl cellulose, xanthan, polyacrylamides and other synthetic polymers. Of these, guar, hydroxypropyl guar and carboxymethylhydroxyethyl guar are typically preferred because of commercial availability and cost performance.

In many instances, if not most, the viscosifying polymer is crosslinked with a suitable crosslinking agent. The crosslinked polymer has an even higher viscosity and is even more effective at carrying proppant into the fractured formation. The borate ion has been used extensively as a crosslinking agent, typically in high pH fluids, for guar, guar derivatives and other galactomannans. See, for example, U.S. Pat. No. 3,059,909 and numerous other patents that describe this classic aqueous gel as a fracture fluid. Other crosslinking agents include, for example, titanium crosslinkers (U.S. Pat. No. 3,888,312), chromium, iron, aluminum, and zirconium (U.S. Pat. No. 3,301,723). Of these, the titanium and zirconium crosslinking agents are typically preferred. Examples of commonly used zirconium crosslinking agents include zirconium triethanolamine complexes, zirconium acetylacetonate, zirconium lactate, zirconium carbonate, and chelants of organic alphahydroxycorboxylic acid and zirconium. Examples of commonly used titanium crosslinking agents include titanium triethanolamine complexes, titanium acetylacetonate, titanium lactate, and chelants of organic alphahydroxycorboxylic acid and titanium.

Additional information on fracturing is found in the description by Janet Gulbis and Richard M. Hodge in Chapter 7 of the text "Reservoir Stimulation" published by John Wiley & Sons, Ltd, Third Edition, 2000 (Editors, Michael J. Economides and Kenneth G. Nolte), which is incorporated herein by reference. Some fracturing fluids have also been energized by the addition of a gas (e.g., nitrogen or carbon dioxide) to create a foam. See, for example, the pioneering work by Roland E. Blauer and Clarence J. Durborow in U.S. Pat. No. 3,937,283 ("Formation Fracturing with Stable Foam"). The rheology of the traditional water-base polymer solutions and also complex fluids, such as foams, can be and typically is modified and augmented by several additives to control their performance. Fluid loss additives are typically added to reduce the loss of fracturing fluids into the formation.

The problems associated with the loss of fracturing fluid to the formation are well known. For example, in 1978 Holditch reported: "The fluid injected during the fracturing treatment will leak off into the formation and will reduce the relative permeability to gas in the invaded region. Near the fracture, the permeability to gas will be reduced to zero." In addition, Holditch said: "In some cases, the injected fracturing fluid may reduce the formation permeability in the invaded zone." Stephen A. Holditch, SPE 7561 (Presented at the $53^{rd}$ Annual Fall Technical Conference and Exhibition of the Society of Petroleum Engineers of AIME, held in Houston, Tex., Oct. 1-3, 1978). The damage to the formation could be severe, and the practical so what of that is reduced flow of hydrocarbons, low production and poor economics on the well. While the state of the art has advanced substantially since Holditch reported on the problems associated with leak off of fracturing fluid, the problems remain the same. See, for example, Vernon G. Constien, George W. Hawkins, R. K. Prud'homme and Reinaldo Navarrete, Chapter 8 entitled "Performance of Fracturing Materials" and the other chapters on fracturing and well stimulation in "Reservoir Stimulation" published by John Wiley & Sons, Ltd, Third Edition, copyright Schlumberger 2000 (Editors, Michael J. Economides and Kenneth G. Nolte), the disclosure of which is incorporated herein by reference. These authors and others emphasize the importance of "cleanup" or "fracture cleanup" to optimize production of the hydrocarbon fluids from the well. The term "cleanup" or "fracture cleanup" refers to the process of removing the fracture fluid (without the proppant) from the fracture after the fracturing process has been completed. Techniques for promoting fracture cleanup often involved reducing the viscosity of the fracture fluid as much as practical so that it will more readily flow back toward the wellbore. So-called "breakers" have been used to reduce fluid viscosity in many instances. The breakers can be enzymes (oxidizers and oxidizer catalysts), and they may be encapsulated to delay their release. See, for example, U.S. Pat. No. 4,741,401 (Walles et al.), assigned to Schlumberger Dowell and incorporated herein by reference. Another technique to aid in the cleanup, albeit by a contrarian approach, is found in U.S. Pat. No. 6,283,212 (Hinkel and England), which is also assigned to Schlumberger Dowell and incorporated herein by reference.

Hydraulic fracturing is a primary tool for improving well productivity by placing or extending channels from the wellbore to the reservoir. This operation is essentially performed by hydraulically injecting a fracturing fluid into a wellbore penetrating a subterranean formation and forcing the fracturing fluid against the formation strata by pressure. The formation strata or rock is forced to crack and fracture. Proppant is placed in the fracture to prevent the fracture from closing and thus, provide improved flow of the recoverable fluid, i.e., oil, gas or water.

The proppant is thus used to hold the walls of the fracture apart to create a conductive path to the wellbore after pumping has stopped. Placing the appropriate proppant at the appropriate concentration to form a suitable proppant pack is thus critical to the success of a hydraulic fracture treatment.

Sand, resin-coated sand, and ceramic particles are the most commonly used proppants, though the literature, for instance U.S. Pat. No. 4,654,266, also mentions the used of walnut hull fragments coated with some bonding additives, metallic shots, or metal-coated beads—nearly spherical but having a passageways to improve their conductibility.

The proppant conductivity is affected principally by two parameters, the proppant pack width and the proppant pack permeability. To improve fracture proppant conductivity, typical approaches include high large diameter proppants. More generally, the most common approaches to improve proppant fracture performance include high strength proppants, large diameter proppants, high proppant concentrations in the proppant pack to obtain wider propped fractures, conductivity enhancing materials such as breakers, flow-back aides, fibers and other material that physically alter proppant packing, and use of non-damaging fracturing fluids such as gelled oils, viscoelastic surfactant based fluids, foamed fluids or emulsified fluids. It is also recognized that grain size, grain-size distribution, quantity of fines and impurities, roundness and sphericity and proppant density have an impact on fracture conductivity.

As mentioned above, the main function of the proppant is to keep the fracture open by overcoming the in-situ stress. Where the proppant strength is not high enough, the closure stress crushes the proppant, creating fines and reducing the conductivity. Sand is typically suitable for closure stresses of less than about 6000 psi (41 MPa), resin-coated sand may be used up to about 8000 psi (55 MPa). Intermediate-strength proppant typically consists of fused ceramic or sintered-bauxite and is used for closure stresses ranging between 5000 psi and 10000 psi (34 MPa to 69 MPa). High-strength proppant, consisting of sintered-bauxite with large amounts of corundum is used at closure stresses of up to about 14000 psi (96 MPa).

Permeability of a propped fracture increases as the square of the grain diameter. However, larger grains are often more susceptible to crush, have more placement problems and tend to be more easily invaded by fines. As the result, the average conductivity over the life of a well may be actually higher with smaller proppants.

In an effort to limit the flowback of particulate proppant materials placed into the formation, it was disclosed in U.S. Pat. No. 5,330,005 to add some fibrous material, mixed with the proppant material. It is believed that the fibers become concentrated into a mat or other three-dimensional framework, which holds the proppant thereby limiting its flowback. The fibers can be of glass, ceramic, carbon, natural or synthetic polymers or metal fibers. They have a length of typically about 2 to 30 mm and a diameter of between 10 and 100 micrometers. According to U.S. Pat. No. 5,908,073 the flowback is prevented through the use of fibrous bundles, made of from about 5 to about 200 individual fibers having lengths in the range of about 0.8 to about 2.5 mm and diameters in the range of about 10 to about 1000 micrometers. It has also known from U.S. Pat. No. 6,059,034 to add to blend the proppant material with a deformable particulate material. The deformable particles may have different shapes such as oval, cubic, bar-shaped, cylindrical, multi-faceted, irregular, tapered—but preferably with a maximum length-based ratio equal or less than 5, and are typically spherical plastic beads or composite particles comprising a non-deformable core and a deformable coating. In another embodiment claimed in U.S. Pat. No. 6,330,916, the particles may comprise ground or crushed materials such as nutshells, seed shells, fruit pits, and processed woods.

It should be emphasized that in all of the four above-mentioned U.S. Patents, the proppant itself is constituted of essentially spherical particles—most typically sand—intermingled with a material that may be elongated. This reflects the general understanding of this art that angular grains fail at lower closure stresses, producing more fines and thus reducing fracture conductivity. On the other hand, round and uniform-sized grains result in higher loads before failure since stresses are more evenly distributed.

Adding fibers or fiber-like products to the products may contribute to a reduction of the proppant flowback—and consequently to a better packing of the proppant in the fracture. Additionally, they contribute to prevent fine migrations and consequently, to prevent a reduction of the proppant conductivity but there is still a need for a new type of proppant that will lead to higher conductivity.

According to the invention, the solid organic polymeric particulate matter composition is selected for its ultimate and delayed reactivity and/or degradation characteristics in providing the required gel breaking action and cleanup, it being required, of course, that its reactivity or degradation in the fluid suspension be sufficiently gradual, delayed, or retarded (delayed) that formation of a gel by the suspension is not significantly inhibited or the gelled suspension broken before the fracturing operation is carried out to the desired extent. That is, the solid organic polymeric particulate matter should not react with other components of the fluid or the particles to be removed and/or transported or the formation components, or decompose or degrade in the fluid suspension, at a rate faster than desired. The suitability of a particular solid organic polymeric particulate material or composition(s) may be determined by testing, as illustrated hereinafter, and a composition or compositions may be prepared, for example, by blending, or may be chosen, which degrade or decompose at a rate corresponding to the time required for carrying out the fracturing operation, as determined by such testing. Accordingly, the solid organic polymeric particulate matter employed in the invention may be chosen from a wide variety of organic polymeric materials of the type mentioned, provided the particles possess such delayed reactivity and/or decomposition characteristics. Thus, natural and synthetic organic polymers or elastomers having an average molecular weight of at least 10,000, preferably at least 15,000 to 18,000, and most preferably at least 100,000, as determined by size exclusion chromatography or other suitable method, having the required reactivity and/or decomposition characteristics, may be employed. As utilized herein, the expressions "organic polymeric", as applied to "compound" and to "material", and "organic polymer" and "polymer", are understood to include not only polymerization products of a monomer, but copolymers, terpolymers, etc. Additionally, all types of mixtures of the mentioned materials may be employed. For example, suitable polymeric particulate matter derived from cellulose, acrylic acid, aramides, acrylonitrile, polyamides, vinylidene, olefins, diolefins, polyester, polyurethane, vinyl alcohol, and vinyl chloride, may be used. Preferred compositions, assuming the required reactivity and/or decomposition characteristics may be selected from rayon, acetate, triacetate, cotton, wool (cellulose group); nylon, acrylic, modacrylic, nitrile, polyester, saran, spandex, vinyon, olefin, vinyl, (synthetic polymer group); azlon, rubber (protein and rubber group), and mixtures thereof. Polyester and polyamide particles of sufficient molecular weight, such as from Dacron® and nylon, respectively, and mixtures thereof, are most preferred. Again, composite particles, comprising natural and/or synthetic materials of appropriate characteristics, may be employed. For example, a suitable composite particle might comprise a core and sheath structure where the sheath material and the core material degrade over different desired periods of time. The compounds or compositions employed as organic polymeric material according to the invention need not be pure, and commercially available materials containing various additives, fillers, etc. or having coatings may be used, so long as such components do not interfere with the required activity.

As indicated, the amount of the organic polymeric particulate matter supplied will be sufficient for the task required, i.e., a sufficient or effective amount, an amount sufficient to provide a sufficient concentration of a composition or compositions which are effective to degrade the gelled suspension to the desired degree. Normally, as also indicated, this composition or compositions will comprise one or more of the ultimate reaction or decomposition products of the organic polymeric material. Preferably, the organic polymeric particulate matter level, i.e., concentration, provided initially in the fluid may range from 0.02 percent up to about 10 percent by weight of the fluid. Most preferably, however, the concentration ranges from about 0.02 percent to about 5.0 percent by weight of fluid.

Particle size and shape, while important, may be varied considerably, depending on timing and transport considerations. Preferably, if irregular or spherical particles of the organic polymer are used, particle size may range from 80 mesh to 2.5 mesh (Tyler), preferably from 60 mesh to 3 mesh. Fibers and/or platelets of the specified polymeric materials are preferred for their mobility and transfer aiding capability. In the case of fibers of the organic polymer, the fibers employed according to the invention may also have a wide range of dimensions and properties. As employed herein, the term "fibers" refers to bodies or masses, such as filaments, of natural or synthetic material(s) having one dimension significantly longer than the other two, which are at least similar in size, and further includes mixtures of such materials having multiple sizes and types. Preferably, in accordance with the invention, individual fiber lengths may range upwardly from about 1 millimeter. Practical limitations of handling, mixing, and pumping equipment in wellbore applications, currently limit the practical use length of the fibers to about 100 millimeters. Accordingly, a preferred range of fiber length will be from about 1 mm to about 100 mm or so, with a most preferred length being from at least about 2 mm up to about 30 mm. Similarly, fiber diameters will preferably range upwardly from about 5 microns, a preferred range being from about 5 microns to about 40 microns, most preferably from about 8 microns to about 20 microns, depending on the modulus of the fiber, as described more fully hereinafter. A ratio of length to diameter (assuming the cross section of the fiber to be circular) in excess of 50 is preferred. However, the fibers may have a variety of shapes ranging from simple round or oval cross-sectional areas to more complex shapes such as trilobe, figure eight, star-shape, rectangular cross-sectional, or the like. Preferably, generally straight fibers with round or oval cross sections will be used. Curved, crimped, branched, spiral-shaped, hollow, fibrillated, and other three dimensional fiber geometries may be used. Again, the fibers may be hooked on one or both ends. Fiber and platelet densities are not critical, and will preferably range from below 1 to 4 g/cm$^3$ or more.

Those skilled in the art will recognize that a dividing line between what constitute "platelets", on one hand, and "fibers", on the other, tends to be arbitrary, with platelets being distinguished practically from fibers by having two dimensions of comparable size both of which are significantly larger than the third dimension, fibers, as indicated, generally having one dimension significantly larger than the other two, which are similar in size. As used herein, the terms "platelet" or "platelets" are employed in their ordinary sense, suggesting flatness or extension in two particular dimensions, rather than in one dimension, and also is understood to include mixtures of both differing types and sizes. In general, shavings, discs, wafers, films, and strips of the polymeric material(s) may be used. Conventionally, the term "aspect ratio" is understood to be the ratio of one dimension, especially a dimension of a surface, to another dimension. As used herein, the phrase is taken to indicate the ratio of the diameter of the surface area of the largest side of a segment of material, treating or assuming such segment surface area to be circular, to the thickness of the material (on average). Accordingly, the platelets utilized in the invention will possess an average aspect ratio of from about 10 to about 10,000, preferably 100 to 1000. Preferably, the platelets will be larger than 5 microns in the shortest dimension, the dimensions of a platelet which may be used in the invention being, for example, 6 mm×2 mm×15 μm.

In a particularly advantageous aspect of the invention, particle size of the organic polymeric particulate matter may be managed or adjusted to advance or retard the reaction or degradation of the gelled suspension in the fracture. Thus, for example, of the total particulate matter content, 20 percent may comprise larger particles, e.g., greater than 100 microns, and 80 percent smaller, say 80 percent smaller than 20 micron particles. Such blending in the gelled suspension may provide, because of surface area considerations, a different time of completion of reaction or decomposition of the particulate matter, and hence the time of completion of gel decomposition or breaking, when compared with that provided by a different particle size distribution.

The selection of the fluid or liquid to form the suspension with the solid organic polymeric particulate material and other components, such as gellant and proppant, is largely a matter of choice, within the capability of those skilled in the art, and per se forms no part of the present invention. As such persons will be aware, however, the fluid, particulate material, gel forming material, etc., must be sufficiently compatible to the extent that they do not react with one another at a rate which would deleteriously interfere to any significant extent with the intended functions specified herein. Commonly, the particular fluid chosen will be determined by such considerations as treating temperature, concentration of solid material to be carried, and the desired objective. In general, any suitable fluid or liquid which provides sufficient viscosity, perhaps in conjunction with solid fibrous materials therein, to transport the proppant and other components utilized to the fracturing area or fracture, does not unduly interfere with the effectiveness of the solid particulate matter of the invention, and which results in minimal damage to the pack and to the formation, may be used, it being understood that the term "fluid", includes mixtures of such materials. The fluid will preferably be aqueous, and may comprise a gas, i.e., a foam may be employed. Any common aqueous well treatment fluid may be employed, keeping the requirements previously mentioned in mind. Suitable fluids may also include aqueous solutions of viscoelastic surfactants, i.e., surfactants which are capable of providing viscosity without requiring the addition of polymers. Fluids comprising oil-in-water emulsions may be used, and, in the appropriate instance, hydrocarbon fluids, such as diesel, may be used. Particularly preferred are the type of fracturing fluids described by Nimerick, Crown, McConnell, and Ainley in U.S. Pat. No. 5,259,455, and those disclosed in U.S. Pat. No. 4,686,052. Proportions of the components of the fluid suspension are selected to insure that fluid character, i.e., flowability, and suspension of the organic polymeric particulate material and solid material, e.g., proppant, are maintained during pumping or down well transport, i.e., an amount of the well treatment fluid or liquid is provided or present sufficient to insure fluid flow for the suspensions. Generally, the composite fluids or fluid suspensions of the invention will comprise viscous liquids.

The solid particulate matter, e.g., fibers, or fibers and/or platelet, containing fluid suspensions used in the invention may be prepared in any suitable manner or in any sequence or order. Thus, the suspension may be provided by blending in any order at the surface, and by addition, in suitable proportions, of the components to the fluid or slurry during treatment on the fly. The suspensions may also be blended offsite. In the case of some materials, which are not readily dispersible, the fibers should be "wetted" with a suitable fluid, such as water or a wellbore fluid, before or during mixing with the fracturing fluid, to allow better feeding of the fibers. Good mixing techniques should be employed to avoid "clumping" of the particulate matter.

To the extent other breaker materials are employed, the total amount of the solid particulate matter of the invention may be reduced. It is possible; however, to provide a combination of solid particulate matter in the manner of the invention along with minor amounts, i.e., less than fifty percent, of other breaker materials, such combinations providing significant transport advantages if the solid particulate matter is in the form of fibers or platelets. As will be understood by those skilled in the art, in the case where fibers and/or platelets are employed to form a porous pack upon completion of the fracturing operation or procedure, e.g., as described in the procedures of the aforementioned U.S. Pat. No. 5,439,055; U.S. Pat. No. 5,330,005; and U.S. Pat. No. 5,501,275, the total amount of fibers employed or pumped, assuming the use of suitable fibers as the solid organic polymeric particulate matter, will include that required for gel breaking and that for porous pack formation. As those skilled in the art will recognize, the fibers employed for pack strengthening will be chosen for durability rather than for the characteristics desired in the breaker materials selected herein, so that, in a given fracturing operation, both types of fibers may be utilized, each contributing a designed function and both contributing to or enhancing matter mobility or transport. Concentrations of "pack-forming" fibers and/or platelets in the fracturing fluid suspension for porous pack formation will be those described in the above listed patents, with even quite minor amounts of fibers and/or platelets being effective or sufficient to enhance transport.

Any suitable polymeric gel forming material or gellant, preferably water soluble, used by those skilled in the art to treat subterranean formations and form stable or stabilized gels of the fluid suspension may be employed in the invention. For simplicity hereinafter, included in the phrase "water soluble", as applied to the gellant, are those suitable polymeric materials which are dispersible or suspendable in water or aqueous liquid. Suitable gellants also include crosslinkable polymers or monomers for forming such polymers under the conditions extant. Such cross-linkable polymeric and polymer forming materials are well known, and the crosslinked polymer or polymers which produce the stable or stabilized gel are preferably formed by reacting or contacting appropriate proportions of the crosslinkable polymer with a crosslinking agent or agents. Similarly, procedures for preparing gelable compositions or fluids and conditions under which such compositions form stable gels in subterranean formations are well known to those skilled in the art. As indicated, gel-forming compositions according to the invention may be formed by mixing, in water, the water soluble crosslinkable polymer and the crosslinking agent.

In forming the gel, the crosslinkable polymer(s) and crosslinking agent and concentrations thereof are normally selected to assure (a) gel formation or presence at subterranean (i.e., formation or reservoir) conditions and (b) suitable time allotment for injection of the composition prior to the completion of gelation, or sufficient fluidity of the gelled composition to allow pumping down well. The polymer (or monomers used to form the polymer) and the crosslinking agent are generally selected and supplied in amounts effective to achieve these objectives. By "effective" amounts of the polymer or polymers (or monomers) and crosslinking agents is meant amounts sufficient to provide crosslinked polymers and form the desired stable gel under the conditions extant. Generally, a water soluble crosslinkable polymer concentration in the aqueous liquid of from about 0.05 to about 40 percent, preferably from about 0.1 percent to about 10 percent, and, most preferably, from about 0.2 percent to about 7 percent, may be employed (or sufficient monomer(s) to form these amounts of polymer). Typically, the crosslinking agent is employed in the aqueous liquid in a concentration of from about 0.001 percent to about 2 percent, preferably from about 0.005 percent to about 1.5 percent, and, most preferably, from about 0.01 percent to about 1.0 percent.

However, if a crosslinked polymer is to be used, the fluids of the invention need not contain both the crosslinkable polymer and the crosslinking agent at the surface. The crosslinkable polymer or the crosslinking agent may be omitted from the fluid sent downhole, the omitted material being introduced into the subterranean formation as a separate slug, either before, after, or simultaneously with the introduction of the fluid. In such cases, concentrations of the slugs will be adjusted to insure the required ratios of the components for proper gel formation at the desired location. Preferably, the surface formulated composition or fluid comprises at least the crosslinkable polymeric material (e.g., acrylamide, vinyl acetate, acrylic acid, vinyl alcohol, methacrylamide, ethylene oxide, or propylene oxide). More preferably, the composition comprises both (a) the crosslinking agent and (b) either (i) the crosslinkable polymer or (ii) the polymerizable monomers capable of forming a crosslinkable polymer. In treating a subterranean fracture, the formulations may be allowed to gel or begin gelation before entering the formation.

As indicated, mixtures of polymeric gel forming material or gellants may be used. Materials which may be used include water soluble crosslinkable polymers, copolymers, and terpolymers, such as polyvinyl polymers, polyacrylamides, cellulose ethers, polysaccharides, lignosulfonates, ammonium salts thereof, alkali metal salts thereof, alkaline earth salts of lignosulfonates, and mixtures thereof. Specific polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar), heteropolysaccharides obtained by the fermentation of starch-derived sugar (e.g., xanthan gum), ammonium and alkali metal salts thereof, and mixtures thereof. Preferred water soluble crosslinkable polymers include hydroxypropyl guar, carboxymethylhydroxypropyl guar, partially hydrolyzed polyacrylamides, xanthan gum, polyvinyl alcohol, the ammonium and alkali metal salts thereof, and mixtures thereof.

Similarly, the crosslinking agent(s) may be selected from those organic and inorganic compounds well known to those skilled in the art useful for such purpose, and the phrase "crosslinking agent", as used herein, includes mixtures of such compounds. Exemplary organic crosslinking agents include, but are not limited to, aldehydes, dialdehydes, phenols, substituted phenols, ethers, and mixtures thereof. Phenol, resorcinol, catechol, phloroglucinol, gallic acid, pyrogallol, 4,4'-diphenol, 1,3-dihydroxynaphthalene, 1,4-benzoquinone, hydroquinone, quinhydrone, tannin, phenyl acetate, phenyl benzoate, 1-naphthyl acetate, 2-naphthyl acetate, phenyl chloracetate, hydroxyphenylalkanols, formaldehyde, paraformaldehyde, acetaldehyde, propanaldehyde, butyraldehyde, isobutyraldehyde, valeraldehyde, heptaldehyde, decanal, glyoxal, glutaraldehyde, terephthaldehyde, hexamethyl-enetetramine, trioxane, tetraoxane, polyoxymethylene, and divinylether may be used. Typical inorganic crosslinking agents are polyvalent metals, chelated polyvalent metals, and compounds capable of yielding polyvalent metals, including organometallic compounds as well as borates and boron complexes, and mixtures thereof. Preferred inorganic crosslinking agents include chromium salts, complexes, or chelates, such as chromium nitrate, chromium citrate, chromium acetate, chromium propionate, chromium malonate, chromium lactate, etc.; aluminum salts, such as aluminum citrate, aluminates, and aluminum complexes and chelates; titanium salts, complexes, and chelates; zirconium salts, complexes or chelates, such as zirconium lactate; and boron containing compounds such as boric acid, borates, and boron complexes. Fluids containing additives such as those described in U.S. Pat. Nos. 4,683,068 and 5,082,579 may be used.

As mentioned, the pre-gel fluid suspension formed in the invention may be foamed, normally by use of a suitable gas. Foaming procedures are well known, and per se form no part of the invention. In such instances, the fluids of the invention will preferably include a surfactant or surfactants. Preferred surfactants are water-soluble or dispersible and have sufficient foaming ability to enable the composition, when traversed or agitated by a gas, to foam. The selection of a suitable surface active agent or agents, is within the ability of those skilled in the art. Preferred surfactants are those which, when incorporated into water in a concentration of about 5 weight percent or less (based on the total weight of water and surfactant), meet the test described in the aforementioned U.S. Pat. No. 5,246,073.

Similarly, the precise nature of the proppant employed is not critical, the proppant being selected for the desired purpose, i.e., "propping" open a fracture, and those skilled in the art may readily select an appropriate wellbore particulate solid or solids for the desired purpose. The term "proppant" is understood to include mixtures, and may include, for example, a mixture of different sized proppants, or a gravel. Resin coated sand or ceramic proppant may be used. Particles or beads of silica, sintered materials or minerals, such as sintered bauxite, alumina, or corundum, may be used. Generally, the proppant will be added or present in the fluid in a concentration of from 0.5 or 1 lb./gallon to about 25 lbs/gallon, preferably from 1 lb./gallon to about 20 lbs/gallon. Normally, the proppant will have an average particle size less than about 8 mesh and greater than 60 or 80 mesh (U.S.). Sized mixtures of particles may be used, such as the common larger sized natural and synthetic inorganic proppant mixtures. Sized sand and synthetic inorganic proppants such as 20/40 sized sand, 16/20 sized sand, 12/20 sized sand, 8/12 sized sand, and similarly sized ceramic proppants, such as "CARBOLITE™" proppants, may be used.

The novel blend of aqueous suspending fluid, proppant, gellant, crosslinking agent, and organic polymeric particulate matter may be prepared, as indicated, in any suitable manner, the components being blended in any suitable sequence. Normally, however, the preferred job execution practice is to mix the entire batch to be pumped during the job. In some instances, it may be preferred to pump the suspension of the invention only during a portion of the job, e.g., as the last 10-25% of the proppant into the fracture as a "tail-in", to control flow back in the most economical manner or for other reasons. A slug may also be pumped at other stages. As mentioned, the invention has particular advantage in treatment of subterranean formations having a temperature above about 225° F.

In one procedural aspect of the invention, the fluid suspension is pumped down well, normally gelled, through the wellbore under fracturing pressure to the subterranean formation, and the subterranean formation may be fractured or the fracture may be extended. Gelling may be initiated or enhanced, for example, by temperature or by pH control, in a manner known to those skilled in the art. The gelled suspension is deposited in the formation, and after a suitable interval, such as after the fracturing operation is completed, the decomposition or reaction of the particulate matter in the downwell environment becomes significant. If necessary, the interval may be extended as appropriate to allow the gelled suspension to "break" or degrade. As used herein, the term "downwell environment" simply refers to the circumstances acting on the organic polymeric particulate matter downwell, including, but not limited to, the temperature of the subterranean formation, the composition of the formation, and any component or components of the suspension. Upon degradation of the gel by the action of the decomposition or reaction products, the fluids resulting from the breaking of the gel, minus leak-off, are then returned or allowed to return from the deposit locus to the wellbore, the decomposition or reaction of the solid particulate matter in effect "removing" organic polymeric particulate matter from the deposit. If additional particulate matter, such as durable fibers and/or platelets, or other materials are in the suspension deposited in the fracture, a matrix or pack of such and proppant (with a minor residuum of well treating fluid) is left in the fracture.

Conventional Drilling Fluids with the Choline Carboxylates of this Invention

It is essential that the drilling fluid ultimately selected and formulated for use in any particular well application be appropriate for the conditions of the well. Therefore, although the base ingredients remain the same, i.e., salt or fresh water and the drilling fluid additives of this invention, other components can be added.

Specifically, materials generically referred to as gelling materials, thinners, fluid loss control agents, and weight materials are typically added to water base drilling fluid formulations. Of these additional materials, each can be added to the formulation in a concentration as rheologically and functionally required by drilling conditions. Typical gelling materials used in aqueous based drilling fluids are bentonite, sepiolite, and attapulgite clays and anionic high-molecular weight, water-soluble polymers such as partially hydrolyzed polyacrylamides.

An important aspect of the present invention is the presence of a weight material in the drilling fluid. Materials that have demonstrated utility as weight materials include Galena (PbS), Hematite ($Fe_2O_3$), Magnetite ($Fe_3O_4$), iron oxide ($Fe_2O_3$) (manufactured), Illmenite ($FeO.TiO_2$), Barite ($BaSO_4$), Siderite ($FeCO_3$), Celestite ($SrSO_4$), Dolomite ($CaCO_3\ MgCO_3$), and Calcite ($CaCO_3$). The weight material is added to the drilling fluid in a functionally effective amount largely dependent on the nature of the formation being drilled. Weight materials are typically present only in drilling fluids and are not generally found in well treatment and stimulation fluids such as fracturing fluids. In fracturing fluids the use of weight materials is specifically avoided for functional reasons.

Similarly, it has been found beneficial to add lignosulfonates as thinners for water-base drilling fluids. Typically lignosulfonates, modified lignosulfonates, polyphosphates and tannins are added. In other embodiments, low molecular weight polyacrylates can also be added as thinners. Thinners are added to a drilling fluid to reduce flow resistance and control gelation tendencies. Other functions performed by thinners include reducing filtration and cake thickness, counteracting the effects of salts, minimizing the effects of water on the formations drilled, emulsifying oil in water, and stabilizing mud properties at elevated temperatures.

As mentioned previously, the drilling fluid composition of this invention contains a weight material. The quantity depends upon the desired density of the final composition. The most preferred weight materials include, but are not limited to, barite, hematite calcium carbonate, magnesium carbonate and the like.

Finally, anionic fluid loss control agents such as modified lignite, polymers, modified starches and modified celluloses can be added to the water base drilling fluid system of this invention.

As indicated, the additives of the invention are selected to have low toxicity and to be compatible with common anionic drilling fluid additives such as polyanionic carboxymethylcellulose (PAC or CMC), polyacrylates, partially-hydrolyzed polyacrylamides (PHPA), lignosulfonates, xanthan gum, etc.

Several preferred embodiments of the invention were prepared for use in the following examples. The several samples of condensates were prepared using various catalysts, as noted.

Triethanolaminemethyl chloride was prepared by mixing 60 grams of triethanolamine with 20 grams of distilled water. 20 grams of methyl chloride was then added to the solution. The solution was heated at about 65.degree. C. for approximately 6 hours. Upon completion of the reaction the excess methyl chloride was evaporated.

In an alternative embodiment, an improved drilling fluid additive was formed by reacting triethanolamine with N,N, N-trimethyl-2-hydroxy-3-chloropropane ammonium chloride to form a water soluble diquat. The reaction was conducted generally according to the procedure set forth above for the preparation of the triethanolaminemethyl chloride.

Condensates of triethanolamine were prepared using various catalysts, followed by quaternization of the condensates. In general, the condensate samples were prepared by mixing 200 grams of triethanolamine with 1 to 10% of the catalyst by weight. The catalysts employed in preparing the samples were sodium hydroxide, zinc chloride and calcium chloride.

Generally, the mixtures were heated between about 100° C. to about 250° C. for several hours until the desired condensation was achieved. The condensation water was distilled off during the reaction. The triethanolamine condensates were then quaternized according to the procedure set forth for the preparation of the triethanolaminemethyl chloride described above.

The simple glycols are useful for lowering water activity and freezing point of an aqueous solution. At moderate concentrations, they can lower the water activity to a level equal to or less than that of most gumbo shales commonly encountered in offshore drilling. This lowering of water activity aids in preventing water adsorption through osmotic effects. The lowering of the freezing point can be utilized to prevent the formation of gas hydrates in deep water drilling while eliminating the use of large amounts of salts.

The water-based drilling fluid system of this invention comprises a water-miscible glycol with a molecular weight of less than about 200, such as ethylene glycol, diethylene glycol, triethylene glycol, propylene glycol, butylene glycol and mixtures thereof, in a range from 30% to 70% by weight, preferably 30% to 50% by weight of the aqueous phase of the said drilling fluid. Incorporated in the aqueous phase of the drilling fluid is an organic cationic material selected from the group consisting of choline hydroxide, choline chloride, choline carbonate, choline bicarbonate, choline sulfate, choline carboxylates and mixtures thereof, or an organic potassium salt such as potassium acetate or potassium formate, preferably choline chloride or a choline carboxylate, in a range from 3% by weight up to saturation, preferably 5% to 20% by weight of the aqueous phase.

A filtration control agent may be added to control the fluid loss of the drilling fluid. Suitable filtration control agents are well known in the art and may include but are not limited to polyanionic cellulose, polyacrylate, polysaccharide, lignite, lignosulfonate, and mixtures thereof.

A viscosifier, such as biopolymers, clays and mixtures thereof, also may be added to increase viscosity and suspend solids and weighting materials.

The density of the drilling fluids can be adjusted by using barite, hematite, calcium carbonate, and mixtures thereof.

To minimize solubilization problems of polymer additives that may be encountered at high concentrations of glycol, the filtration control agent and viscosifier should be pre-solubilized in water before the addition of glycol.

The present invention is directed to a water-base drilling fluid for use in drilling wells through a formation containing a shale which swells in the presence of water. Generally the drilling fluid of the present invention includes a weight material, a shale hydration inhibition agent and an aqueous continuous phase. As disclosed below, the drilling fluids of the present invention may also include additional components, such as fluid loss control agents, bridging agents, lubricants, anti-bit balling agents, corrosion inhibition agents, surfactants and suspending agents and the like which may be added to an aqueous based drilling fluid.

The shale hydration inhibition agent of the present invention is preferably a polyoxyalkyleneamine which inhibits the swelling of shale that may be encountered during the drilling process. Preferably the alkylene group is a propylene, thus the shale inhibition agents of the present invention may be selected from the general group of polyoxypropyleneamines. While a variety of members of this group may serve as shale inhibition agents, we have found that compounds having the general formula

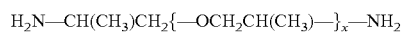

provide effective inhibition of shale hydration.

The value of x has been found to be a factor in the ability of the shale hydration inhibitors to carry out their desired role. The value of x may be a whole number or fractional number that reflects the average molecular weight of the compound. In one embodiment of the present invention x may have a value less than 15 and preferably have a value between about 1 and about 5. In one particularly preferred embodiment, the value of x has an average number of about 2.6.

Alternatively and in another embodiment of the present invention, the value of x is determined by the molecular weight of the shale hydration inhibition agent. Thus x is selected such that the average molecular weight of the hydration inhibition agent is from about 132 to about 944 and preferably x is selected such that the average molecular weight of the hydration inhibition agent is from about 190 to about 248. However, regardless of how a particular value of x is selected, the key criteria are that the shale hydration inhibition agent should function as intended in the drilling fluid and should minimize any impact it might have on the other properties of the drilling fluid.

The shale hydration inhibition agent should be present in sufficient concentration to reduce either or both the surface hydration based swelling and/or the osmotic based swelling of the shale. The exact amount of the shale hydration inhibition agent present in a particular drilling fluid formulation can be determined by a trial and error method of testing the combination of drilling fluid and shale formation encountered. Generally however, the shale hydration inhibition agent of the present invention may be used in drilling fluids in a concentration from about 1 to about 18 pounds per barrel (lbs/bbl or ppb) and more preferably in a concentration from about 2 to about 12 pounds per barrel of drilling fluid.

In addition to the inhibition of shale hydration by the shale hydration inhibition agent, other properties are beneficially achieved. In particular it has been found that the shale hydration inhibition agents of the present invention may also be further characterized by their compatibility with other drilling fluid components, tolerant to contaminants, temperature stability and low toxicity. These factors contribute to the concept that the shale hydration inhibition agents of the present invention may have broad application both in land based drilling operations as well as offshore drilling operations.

The drilling fluids of the present invention include a weight material in order to increase the density of the fluid. The primary purpose for such weighting materials is to increase the density of the drilling fluid so as to prevent kick-backs and blow-outs. One of skill in the art should know and understand that the prevention of kick-backs and blow-outs is important to the safe day to day operations of a drilling rig. Thus the weight material is added to the drilling fluid in a functionally effective amount largely dependent on the nature of the formation being drilled.

Weight materials suitable for use in the formulation of the drilling fluids of the present invention may be generally selected from any type of weighting materials be it in solid, particulate form, suspended in solution, dissolved in the aqueous phase as part of the preparation process or added afterward during drilling. It is preferred that the weight material be selected from the group including barite, hematite, iron oxide, calcium carbonate, magnesium carbonate, organic and inorganic salts, and mixtures and combinations of these compounds and similar such weight materials that may be utilized in the formulation of drilling fluids.

The aqueous based continuous phase may generally be any water based fluid phase that is compatible with the formulation of a drilling fluid and is compatible with the shale hydration inhibition agents disclosed herein. In one preferred embodiment, the aqueous based continuous phase is selected from: fresh water, sea water, brine, mixtures of water and water soluble organic compounds and mixtures thereof. The amount of the aqueous based continuous phase should be sufficient to form a water based drilling fluid. This amount may range from nearly 100% of the drilling fluid to less than 30% of the drilling fluid by volume. Preferably, the aqueous based continuous phase is from about 95 to about 30% by volume and preferably from about 90 to about 40% by volume of the drilling fluid.

In addition to the other components previously noted, materials generically referred to as gelling materials, thinners, and fluid loss control agents, are optionally added to water base drilling fluid formulations. Of these additional materials, each can be added to the formulation in a concentration as Theologically and functionally required by drilling conditions. Typical gelling materials used in aqueous based drilling fluids are bentonite, sepiolite clay, attapulgite clay, anionic high-molecular weight polymer and biopolymers.

Thinners such as lignosulfonates are also often added to water-base drilling fluids. Typically lignosulfonates, modified lignosulfonates, polyphosphates and tannins are added. In other embodiments, low molecular weight polyacrylates can also be added as thinners. Thinners are added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures.

A variety of fluid loss control agents may be added to the drilling fluids of the present invention that are generally selected from a group consisting of synthetic organic polymers, biopolymers, and mixtures thereof. The fluid loss control agents such as modified lignite, polymers, modified starches and modified celluloses may also be added to the water base drilling fluid system of this invention. In one embodiment it is preferred that the additives of the invention should be selected to have low toxicity and to be compatible with common anionic drilling fluid additives such as polyanionic carboxymethylcellulose (PAC or CMC), polyacrylates, partially-hydrolyzed polyacrylamides (PHPA), lignosulfonates, xanthan gum, mixtures of these and the like.

The drilling fluid of the present invention may further contain an encapsulating agent generally selected from the group consisting of synthetic organic, inorganic and biopolymers and mixtures thereof. The role of the encapsulating agent is to absorb at multiple points along the chain onto the clay particles, thus binding the particles together and encapsulating the cuttings. These encapsulating agents help improve the removal of cuttings with less dispersion of the cuttings into the drilling fluids. The encapsulating agents may be anioic, cationic or non-ionic in nature.

Other additives that could be present in the drilling fluids of the present invention include products such as lubricants, penetration rate enhancers, defoamers, corrosion inhibitors and loss circulation products. Such compounds should be known to one of ordinary skill in the art of formulating aqueous based drilling fluids.

The use of the above disclosed drilling fluids is contemplated as being within the scope of the present invention. Such use would be conventional to the art of drilling subterranean wells and one having skill in the art should appreciate such processes and applications.

Thus one embodiment of the present invention may include a method of reducing the swelling of shale clay in a well, involving circulating in the well a water-base drilling fluid formulated in accordance with the present disclosure. Preferably such a fluid would include: an aqueous based continuous phase, a weight material and a shale hydration inhibition agent having the formula:

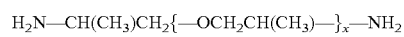

$$H_2N-CH(CH_3)CH_2\{-OCH_2CH(CH_3)-\}_x-NH_2$$

where x should have a value less than 15, and preferably between about 1 and about 5 and more preferably x should have an average number of about 2.6. Further the drilling fluid should include the shale hydration inhibition agent present in sufficient concentration to reduce the swelling of the clay encountered in the well drilling process.

Another embodiment of the present inventive method includes a method of reducing the swelling of shale in a well comprising circulation in the well, a water-base fluid formulated in accordance with the teachings of this disclosure.

EXPERIMENTS OF THE INVENTION

Example 1

This example illustrates the preparation of an under-balanced drilling fluid including choline chloride as an anti-swelling agent for reactive shale and/or clay.

An aqueous drilling fluid was prepared including about 0.5% v/v of a foamer or a density reduction additive, about 0.2% v/v of a corrosion inhibitor and from about 0.1 to about 2.0% (v/v) of a 70 wt. % aqueous choline chloride solution available from Bioproducts, Inc. and a sufficient amount of KOH (a pH buffer) to adjust the pH to about 10.5.

Example 2

This example illustrates the testing of the drilling fluids of Example 1.

A ground shale and/or clay sample was reduced in size using a mortar and pestle and seize through a 35 mesh screen. The ground shale and/or clay (2.0% w/w) was hydrated using tap water for 15 minutes using a Silverson L4RT high speed blender. After blending for about 15 minutes, shale hydration was continued for about 24 hour on a standard stir plate. 100 mL of the resulting hydrated shale and/or clay was removed and was place in a 200 mL beaker. Add chemical was stir on stir plate for 1-2 minutes. Using a 5-mL syringe, inject test solution into a Capillary Suction Timer (CST)-FANN Instruments Model 440. The instrument uses Venture Innovations INC CST paper Part No: IFP-9053, Size 7×9 cm. Record reading and wash equipment and repeat three times. Take average of three readings.

Testing was conducted using a standard Capillary Suction Timer (CST). CSTs were reduced from 189.6 to 33.5 seconds with the addition of the Choline Chloride (2% v/v).

Example 3

This example illustrates the preparation of choline formate.

A 50 wt. % aqueous solution of choline hydroxide available from Aldrich Chemical was diluted to a 25 wt. % aqueous solution of choline hydroxide with DI water. 26.82 g of the 25 wt. % solution of choline hydroxide and 2.79 g of a 98 wt. % of formic acid available from Fluka Chemical were added a stirred flash resulting in a solution having a pH of 8.65 as read on an Orion 230A+ pH Meter. The reaction resulting in the formation of choline formate.

In an analogous manner, other choline carboxylates can be prepared by simply replacing the formic acid with another organic acid. Alternatively, the formic acid can be replaced by an inorganic acid.

CORROSION TESTING

Oxygen Corrosion Test 2-5

General Procedure

A 3% KCl solution was prepared and pH adjusted using DPK02p41 buffer (69.15 g of a 47 wt. % solution of $K_2CO_3$, 27.8 g of a 45 wt. % solution of KOH, 3.05 g DI Water). Test chemicals were then added to each flask followed by a probe. The following laboratory equipment were used in the testing described below: A Rohrback Cosasco System 9030 Plus Instrument, part number—710680-2-115-33-33; Corrater Probe; Corrater electrodes, Markson pH meter, and Corning stirrer/hot plate.

Solutions for Test 2

Solution B3

A solution was prepared including: (a) 0.5 wt. % foamer FMA100 available from Weatherford International, LLC of Houston, Tex.; (b) 0.2 wt. % corrosion inhibitor CorrFoam 1 available from Weatherford International, LLC of Houston, Tex.; (c) 0.2 wt. % shale anti-swelling agent NCL100 available from Weatherford International, LLC of Houston, Tex.; and (d) the remainder deionized water.

Solution B4

A solution was prepared including: (a) 0.5 wt. % foamer FMA100 available from Weatherford International, LLC of Houston, Tex.; (b) 0.2 wt. % corrosion inhibitor CorrFoam 5 available from Weatherford International, LLC of Houston, Tex.; (c) 0.2 wt. % shale anti-swelling agent SHALE GUARD™ NCL100 available from Weatherford International, LLC of Houston, Tex.; and (d) the remainder deionized water.

Solution B7

A solution was prepared including: (a) 0.5 wt. % foamer Kleen Foam available from Weatherford International, LLC of Houston, Tex.; (b) 0.2 wt. % corrosion inhibitor CorrFoam 1 available from Weatherford International, LLC of Houston, Tex.; (c) 0.2 wt. % shale anti-swelling agent SHALE GUARD™ NCL100 available from Weatherford International, LLC of Houston, Tex.; and (d) the remainder deionized water.

Solution B8

A solution was prepared including: (a) 0.5 wt. % foamer Kleen Foam available from Weatherford International, LLC of Houston, Tex.; (b) 0.2 wt. % corrosion inhibitor CorrFoam 5 available from Weatherford International, LLC of Houston, Tex.; (c) 0.2 wt. % shale anti-swelling agent SHALE GUARD™ NCL100 available from Weatherford International, LLC of Houston, Tex.; and (d) the remainder deionized water.

Solutions for Test 3

Solution B1

A solution was prepared including: (a) 0.5 wt. % foamer FMA100 available from Weatherford International, LLC of Houston, Tex.; (b) 0.2 wt. % corrosion inhibitor CorrFoam 1 available from Weatherford International, LLC of Houston, Tex.; (c) 1.0 wt. % shale anti-swelling agent, a 70 wt. % choline chloride solution; and (d) the remainder deionized water.

Solution B2

A solution was prepared including: (a) 0.5 wt. % foamer FMA100 available from Weatherford International, LLC of Houston, Tex.; (b) 0.2 wt. % corrosion inhibitor CorrFoam 5 available from Weatherford International, LLC of Houston, Tex.; (c) 1.0 wt. % shale anti-swelling agent, a 70 wt. % choline chloride solution; and (d) the remainder deionized water.

Solution B5

A solution was prepared including: (a) 0.5 wt. % foamer Kleen Foam available from Weatherford International, LLC of Houston, Tex.; (b) 0.2 wt. % corrosion inhibitor CorrFoam 1 available from Weatherford International, LLC of Houston, Tex.; (c) 1.0 wt. % shale anti-swelling agent, a 70 wt. % choline chloride solution; and (d) the remainder deionized water.

Solution B6

A solution was prepared including: (a) 0.5 wt. % foamer Kleen Foam available from Weatherford International, LLC of Houston, Tex.; (b) 0.2 wt. % corrosion inhibitor CorrFoam 5 available from Weatherford International, LLC of Houston, Tex.; (c) 0.2 wt. % shale anti-swelling agent, a 70 wt. % choline chloride solution; and (d) the remainder deionized water.

Solutions for Test 4

Solution B10

A solution was prepared including: (a) 0.5 wt. % foamer FMA100 available from Weatherford International, LLC of Houston, Tex.; (b) 0.2 wt. % corrosion inhibitor CorrFoam 1 available from Weatherford International, LLC of Houston, Tex.; and (c) the remainder deionized water.

Solution B11

A solution was prepared including: (a) 0.5 wt. % foamer FMA100 available from Weatherford International, LLC of Houston, Tex.; (b) 0.2 wt. % corrosion inhibitor CorrFoam 5 available from Weatherford International, LLC of Houston, Tex.; and (c) the remainder deionized water.

Solution B12

A solution was prepared including: (a) 0.5 wt. % foamer Kleen Foam available from Weatherford International, LLC of Houston, Tex.; (b) 0.2 wt. % corrosion inhibitor CorrFoam 1 available from Weatherford International, LLC of Houston, Tex.; and (c) the remainder deionized water.

Solution B13

A solution was prepared including: (a) 0.5 wt. % foamer Kleen Foam available from Weatherford International, LLC of Houston, Tex.; (b) 0.2 wt. % corrosion inhibitor CorrFoam 5 available from Weatherford International, LLC of Houston, Tex.; and (c) the remainder deionized water.

Solutions for Test 5

Solution B14

A solution was prepared including: (a) 0.5 wt. % foamer FMA100 available from Weatherford International, LLC of Houston, Tex.; (b) 0.2 wt. % corrosion inhibitor Carboshield 100 available from Lonza Inc. Corporation New York, N.Y.; (c) 1.0 wt. % shale anti-swelling agent, a 70 wt. % choline chloride solution; and (d) the remainder deionized water.

Solution B15

A solution was prepared including: (a) 0.5 wt. % foamer FMA100 available from Weatherford International, LLC of Houston, Tex.; (b) 0.2 wt. % corrosion inhibitor Carboshield 100 available from Lonza Inc. Corporation New York, N.Y.; (c) 1.0 wt. % shale anti-swelling agent, a 70 wt. % choline chloride solution; and (d) the remainder deionized water.

Solution B16

A solution was prepared including: (a) 0.5 wt. % foamer Kleen Foam available from Weatherford International, LLC of Houston, Tex.; (b) 0.2 wt. % corrosion inhibitor DD-04-32 available from Weatherford International, LLC of Houston, Tex.; (c) 1.0 wt. % shale anti-swelling agent, a 70 wt. % choline chloride solution; and (d) the remainder deionized water.

Solution B17

A solution was prepared including: (a) 0.5 wt. % foamer Kleen Foam available from Weatherford International, LLC of Houston, Tex.; (b) 0.2 wt. % corrosion inhibitor DD-04-32 available from Weatherford International, LLC of Houston, Tex.; (c) 0.2 wt. % shale anti-swelling agent, a 70 wt. % choline chloride solution; and (d) the remainder deionized water.

Oxygen Corrosion Test 1 & 6

General Procedure

A 3% KCl solution was prepared and pH adjusted using DPK02p41 buffer (69.15 g of a 47 wt. % solution of $K_2CO_3$, 27.8 g of a 45 wt. % solution of KOH, 3.05 g DI Water). Test chemicals were then added to each flask followed by a probe. The following laboratory equipment were used in the testing described below: A Rohrback Cosasco System 9030 Plus Instrument, part number—710680-2-115-33-33; Corrater Probe; Corrater electrodes, Markson pH meter, and Corning stirrer/hot plate.

Solutions for Test 1

Solution B1

A solution was prepared including: (a) 0.5 wt. % foamer FMA100 available from Weatherford International, LLC of Houston, Tex.; (b) 0.2 wt. % corrosion inhibitor CorrFoam 1 available from Weatherford International, LLC of Houston, Tex.; (c) 1.0 wt. % shale anti-swelling agent, a 70 wt. % choline chloride solution; and the remainder DPK02p41 buffer.

Solution B2

A solution was prepared including: (a) 0.5 wt. % foamer FMA100 available from Weatherford International, LLC of Houston, Tex.; (b) 0.2 wt. % corrosion inhibitor CorrFoam 5 available from Weatherford International, LLC of Houston, Tex.; (c) 1.0 wt. % shale anti-swelling agent, a 70 wt. % choline chloride solution; and (d) the remainder DPK02p41 buffer.

Solution B5

A solution was prepared including: (a) 0.5 wt. % foamer Kleen Foam available from Weatherford International, LLC of Houston, Tex.; (b) 0.2 wt. % corrosion inhibitor CorrFoam 1 available from Weatherford International, LLC of Houston, Tex.; (c) 1.0 wt. % shale anti-swelling agent, a 70 wt. % choline chloride solution; and (d) the remainder DPK02p41 buffer.

Solution B6

A solution was prepared including: (a) 0.5 wt. % foamer Kleen Foam available from Weatherford International, LLC of Houston, Tex.; (b) 0.2 wt. % corrosion inhibitor CorrFoam 5 available from Weatherford International, LLC of Houston, Tex.; (c) 0.2 wt. % shale anti-swelling agent, a 70 wt. % choline chloride solution; and (d) the remainder DPK02p41 buffer.

Solutions for Test 6

Solution B6A

A solution was prepared including: (a) 0.5 wt. % foamer Kleen Foam available from Weatherford International, LLC of Houston, Tex.; (b) 0.2 wt. % corrosion inhibitor CorrFoam 5 available from Weatherford International, LLC of Houston, Tex.; (c) 1.0 wt. % shale anti-swelling agent, a 70 wt. % choline chloride solution; and (d) the remainder DPK02p41 buffer.

Solution B6B

A solution was prepared including: (a) 0.5 wt. % Kleen Foam available from Weatherford International, LLC of Houston, Tex.; (b) 0.2 wt. % corrosion inhibitor CorrFoam 5 available from Weatherford International, LLC of Houston, Tex.; (c) 1.0 wt. % shale anti-swelling agent, a 70 wt. % choline chloride solution; and (d) the remainder DPK02p41 buffer.

Solution B6C

A solution was prepared including: (a) 0.5 wt. % foamer Kleen Foam available from Weatherford International, LLC of Houston, Tex.; (b) 0.2 wt. % corrosion inhibitor CorrFoam 1 available from Weatherford International, LLC of Houston, Tex.; (c) 1.0 wt. % shale anti-swelling agent, a 70 wt. % choline chloride solution; and (d) the remainder is 99 wt. % triethanol amine buffer.

Solution B6D

A solution was prepared including: (a) 0.5 wt. % foamer Kleen Foam available from Weatherford International, LLC of Houston, Tex.; (b) 0.2 wt. % corrosion inhibitor CorrFoam 5 available from Weatherford International, LLC of Houston, Tex.; (c) 0.2 wt. % shale anti-swelling agent, a 70 wt. % choline chloride solution; and (d) the remainder is 60 wt. % triethanol amine/40 wt. % $K_2CO_3$ buffer.

TABLE 1

Test Data on the Interaction of Corrosion Inhibitors and Scale Anti-Swell Inhibitors

| Test # | TS* | Foamer | CI[a] | SI[b] | Clarity | CR[c] | Imb[d] | Time hr | pH initial | pH final |
|---|---|---|---|---|---|---|---|---|---|---|
| 2 | B3 | FMA100 | CF 1[e] | SG-NCL100[f] | T[g] | 25.79 | 12.1 | 2.6 | 10.92 | 8.35 |
| 2 | B4 | FMA100 | CF 5[h] | SG-NCL100[f] | T[g] | 20.09 | 13.7 | 2.6 | 10.92 | 8.35 |
| 2 | B7 | Kleen Foam | CF 1[e] | SG-NCL100[f] | T[g] | 12.92 | 7.45 | 2.6 | 10.92 | 8.21 |
| 2 | B8 | Kleen Foam | CF 5[h] | SG-NCL100[f] | T[g] | 32.84 | 26.2 | 2.6 | 10.92 | 8.32 |
| 3 | B1 | FMA100 | CF 1[e] | choline salt | T[g] | 7.88 | 29.7 | 3.75 | 10.93 | 10.89 |
| 3 | B2 | FMA100 | CF 5[h] | choline salt | T[g] | 12.37 | 11.1 | 3.75 | 10.93 | 10.89 |
| 3 | B5 | Kleen Foam | CF 1[e] | choline salt | T[g] | 7.67 | 8.26 | 3.75 | 11.0 | 10.89 |
| 3 | B6 | Kleen Foam | CF 5[h] | choline salt | T[g] | 10.71 | 3.05 | 3.75 | 11.0 | 10.89 |
| 4 | B10 | FMA100 | CF 1[e] | none | T[g] | 15.98 | 10.9 | 3.0 | 11.2 | 10.26 |
| 4 | B11 | FMA100 | CF 5[h] | none | T[g] | 21.80 | 0.4 | 3.0 | 11.2 | 10.26 |
| 4 | B12 | Kleen Foam | CF 1[e] | none | T[g] | 20.13 | 6.13 | 3.0 | 11.2 | 10.26 |
| 4 | B13 | Kleen Foam | CF 5[h] | none | T[g] | 21.21 | 13.0 | 3.0 | 11.2 | 10.26 |
| 5 | B14 | Kleen Foam | CS[i] | choline salt | O[j] | 4.98 | 2.35 | 21.5 | 11.0 | 10.89 |
| 5 | B15 | Kleen Foam | CS[i] | choline salt | O[j] | 4.89 | 3.49 | 21.5 | 11.0 | 10.89 |
| 5 | B16 | Kleen Foam | DD[k] | choline salt | R[l] | 11.62 | 3.67 | 21.5 | 11.0 | 10.87 |
| 5 | B17 | Kleen Foam | DD[k] | choline salt | R[l] | 5.31 | 6.82 | 21.5 | 11.0 | 10.87 |
| 6 | B6A | Kleen Foam | CF 5[h] | choline salt | T[g] | 1.45 | 1.70 | 18.5 | 6.7 | 6.8 |
| 6 | B6B | Kleen Foam | CF 5[h] | choline salt | T[g] | 1.27 | 1.57 | 18.5 | 6.7 | 6.8 |
| 6 | B6C | Kleen Foam | CF 5[h] | choline salt | T[g] | 1.26 | 2.03 | 18.5 | 6.7 | 6.91 |
| 6 | B6D | Kleen Foam | CF 5[h] | choline salt | T[g] | 1.07 | 0.17 | 18.5 | 6.7 | 6.85 |

*Test Solution,
[a]corrosion inhibitor;
[b]shale anti-swell inhibitor;
[c]corrosion rate;
[d]imbalance;
[e]CorrFoam 1;
[f]SHALE-GUARD™ NCL100;
[g]T means transparent;
[h]CorrFoam 5;
[i]Carboshield 100;
[j]O means opaque;
[k]DD-04-32; and
[l]R means rusty.

It is apparent from the data that the combination of the choline salt, choline chloride, and a corrosion inhibitor generally showed enhanced protection over conventional shale anti-swell agents. The data especially demonstrates that a class of preferred foaming solutions include Klean Foam and a choline salt. These unique foaming agent compositions are clear solutions and have outstanding corrosion inhibition properties. Thus, choline salts not only are shale anti-swelling agents, they beneficially interact with the corrosion inhibitors to produce a foaming system with enhanced corrosion protection. The behavior is opposite the behavior seen with conventional shale anti-swell agents.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for drilling a wellbore hole to a target formation through one or a plurality of reactive shale and/or clay zones comprising the steps of:
   providing a water-based drilling fluid comprising:
   an effective amount of a choline carboxylate salt or a plurality of choline carboxylate salts,
   a weight material,
   an anionic polymer;
   a suspending agent, and
   water; and
   circulating the drilling fluid through the wellbore hole during drilling,
where a hydrostatic pressure of the drilling fluid is equal to or greater than a hydrostatic pressure of the formation through which the wellbore hole is being drilled and where the effective amount of the choline salt or the plurality of choline salts is sufficient to reduce a swelling tendency of reactive shales and/or clays during operations.

2. The method of claim 1, wherein the effective amount of the choline salts or salts is from about 0.01% v/v and about 10% v/v.

3. The method of claim 1, wherein the drilling fluid further comprising a density reduction additive is present in an amount from about 0.01% v/v and about 10.0% v/v.

4. The method of claim 3, wherein the density reduction additive comprises a foamer.

5. The method of claim 4, further comprising the step of:
   supply a gas into the drilling fluid to form a foamed drilling fluid with reduced density.

6. The method of claim 1, further comprising:
   a corrosion inhibitor.

7. The method of claim 6, wherein the corrosion inhibitor is present in an amount from about 0.05% v/v to about 0.5% v/v.

8. The method of claim 1, wherein the drilling fluid comprises:
   from about 0.1% v/v to about 5.0% v/v of the a density reduction additive, from about 0.1% v/v to about 5.0% v/v of a choline salt solution including the choline carboxylate salt or the plurality of choline carboxylate salts and the remainder being water.

9. The method of claim 8, further comprising the step of:
supply a gas into the dulling fluid to form a foamed drilling fluid with reduced density.

10. The method of claim 8, further comprising a corrosion inhibitor present in an amount from about 0.01% v/v to about 0.5% v/v of a corrosion inhibitor.

11. The method of claim 1, wherein the drilling fluid comprises:
from about 0.2% v/v to about 4.0% v/v of the a density reduction additive,
from about 0.1% v/v to about 3.0% v/v of a choline salt solution including the choline carboxylate salt or the plurality of choline carboxylate salts and
a remainder being water.

12. The method of claim 11, further comprising the step of:
supply a gas into the drilling fluid to form a foamed drilling fluid with reduced density.

13. The method of claim 8, further comprising a corrosion inhibitor present in an from about 0.05% v/v to about 0.3% v/v of a corrosion inhibitor.

14. The method of claim 1, wherein the choline salt or salts are selected from the group consisting of choline organic counterion salts, choline inorganic counterion salts, and mixture or combinations thereof.

15. The method of claim 1, wherein the choline salt or salts are selected from the group consisting of choline halide counterion salts, choline carboxylate counterion salts, choline nitrogen oxide counterion salts, choline phosphorus oxide counterion salts, choline sulfur oxide counterion salts, choline halogen oxide counterion salts, choline metal oxide counterion salts, choline carbon oxide counterion salts, choline boron oxide counterion salts, choline perfluoro counterion salts, hydrogen oxide counterion salts and mixtures or combinations thereof.

16. The method of claim 1, wherein the choline salt or salts are given by the general formula:

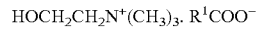

$HOCH_2CH_2N^+(CH_3)_3 \cdot R^1COO^-$ where $R^1$ is an alkyl group, alkenyl group, alkynyl group, an aryl group, an alkaryl group, an aralkyl group, alkenylaryl group, aralkenyl group, alkynylaryl group, aralkynyl group hetero atom analogs, where the hetero atom is selected from the group consisting of boron, nitrogen, oxygen, fluorine, phosphorus, sulfur, chlorine, bromine, iodine, and mixture or combinations thereof, or mixtures or combinations thereof.

17. The method of claim 1, wherein the drilling fluid further comprising:
a PH modifier.

18. The method of claim 17, wherein the PH modifier is selected from the group consisting alkali hydroxides, alkali carbonates, alkali bicarbonates, alkaline earth metal hydroxides, alkaline earth metal carbonates, alkaline earth metal bicarbonates, rare earth metal carbonates, rare earth metal bicarbonates, rare earth metal hydroxides, amines, hydroxylamines ($NH_2OH$), alkylated hydroxyl amines, and mixtures or combinations thereof.

19. The method of claim 17, wherein the pH modifier is selected from the group consisting of KOH, NaOH, $Ca(OH)_2$, CaO, $Na_2CO_3$, $NaHCO_3$, MgO, $Mg(OH)_2$, triethylamine, hydroxylamine, methylhydroxylamine, and mixtures or combinations thereof.

20. The method of claim 1, wherein the drilling fluid has a pH of about 10.5.

21. The method of claim 1, wherein the suspending agent is selected from the group consisting of bentonite, polymeric suspending agent, and partially hydrolyzed polyacrylamide.

* * * * *